(12) United States Patent
Forster et al.

(10) Patent No.: US 11,562,604 B2
(45) Date of Patent: Jan. 24, 2023

(54) TRAILER SAFETY SYSTEM AND METHODS OF USE THEREOF

(71) Applicant: Trailer Safe Global Pty Ltd, Underwood (AU)

(72) Inventors: Joseph Forster, Brisbane (AU); Colin Neave, Brisbane (AU); Brent Dangerfield, Brisbane (AU); Daryl Dangerfield, Brisbane (AU)

(73) Assignee: Trailer Safe Global Pty Ltd, Underwood (AU)

( * ) Notice: Subject to any disclaimer, the term of this patent is extended or adjusted under 35 U.S.C. 154(b) by 186 days.

(21) Appl. No.: 17/259,566

(22) PCT Filed: Jul. 17, 2019

(86) PCT No.: PCT/AU2019/050749
§ 371 (c)(1),
(2) Date: Jan. 12, 2021

(87) PCT Pub. No.: WO2020/014742
PCT Pub. Date: Jan. 23, 2020

(65) Prior Publication Data
US 2021/0272397 A1    Sep. 2, 2021

(30) Foreign Application Priority Data
Jul. 17, 2018    (AU) .............................. 2018902585

(51) Int. Cl.
*G07C 5/08*    (2006.01)
*B62D 53/08*    (2006.01)
(Continued)

(52) U.S. Cl.
CPC ......... *G07C 5/0816* (2013.01); *B62D 53/085* (2013.01); *B62D 53/10* (2013.01); *G07C 5/008* (2013.01); *G08B 25/10* (2013.01)

(58) Field of Classification Search
CPC .... G07C 5/0816; G07C 5/008; B62D 53/085; B62D 53/10; B62D 53/12; G08B 25/10;
(Continued)

(56) References Cited

U.S. PATENT DOCUMENTS

| 9,004,519 B1 * | 4/2015 | Beech ................... | B62D 13/06 |
| | | | 280/442 |
| 2010/0052290 A1 * | 3/2010 | McCune ............... | B60D 1/322 |
| | | | 188/266.2 |
| 2015/0343865 A1 * | 12/2015 | Hile ...................... | B62D 53/10 |
| | | | 280/432 |

FOREIGN PATENT DOCUMENTS

| AU | 2016100223 | * | 3/2016 |
| AU | 2016100223 B4 | | 10/2017 |

(Continued)

OTHER PUBLICATIONS

International Search Report and Written Opinion dated Aug. 28, 2019, in connection with International Patent Application No. PCT/AU2019/050749, filed Jul. 17, 2019, 8 pgs.
(Continued)

*Primary Examiner* — Omar Casillashernandez
(74) *Attorney, Agent, or Firm* — Chiesa Shahinian & Giantomasi PC

(57) ABSTRACT

The present invention concerns systems, a kit and methods for monitoring coupling of a vehicle and a trailer or a trailer and another trailer. The system includes two sensors associated with a turntable of a towing vehicle, said sensors consisting of: a contact sensor configured to detect when a skid plate of a vehicle to be towed is in contact with the turntable; and a locking sensor configured to detect when the locking mechanism is in a locked configuration. The system further including a controller operatively connected to the two sensors and configured to receive output signals from the contact sensor and the locking sensor and to determine (Continued)

whether safe coupling has been achieved based on the output signals.

21 Claims, 13 Drawing Sheets

(51) Int. Cl.
*B62D 53/10* (2006.01)
*G07C 5/00* (2006.01)
*G08B 25/10* (2006.01)

(58) Field of Classification Search
CPC ........... B60D 1/015; B60D 1/62; G01S 15/02; G01S 17/04; G01S 17/02; H03K 17/952; H03K 17/955
USPC ........................................................ 340/431
See application file for complete search history.

(56) References Cited

FOREIGN PATENT DOCUMENTS

| WO | 2017152234 A1 | 9/2017 | |
|---|---|---|---|
| WO | 2018035566 A1 | 3/2018 | |
| WO | WO-2018035566 A1 * | 3/2018 | ............. B60D 1/015 |

OTHER PUBLICATIONS

Extended European Search Report dated Sep. 13, 2021, in connection with European Patent Application No. 19838676.5, filed Jul. 17, 2019, 8 pgs.

* cited by examiner

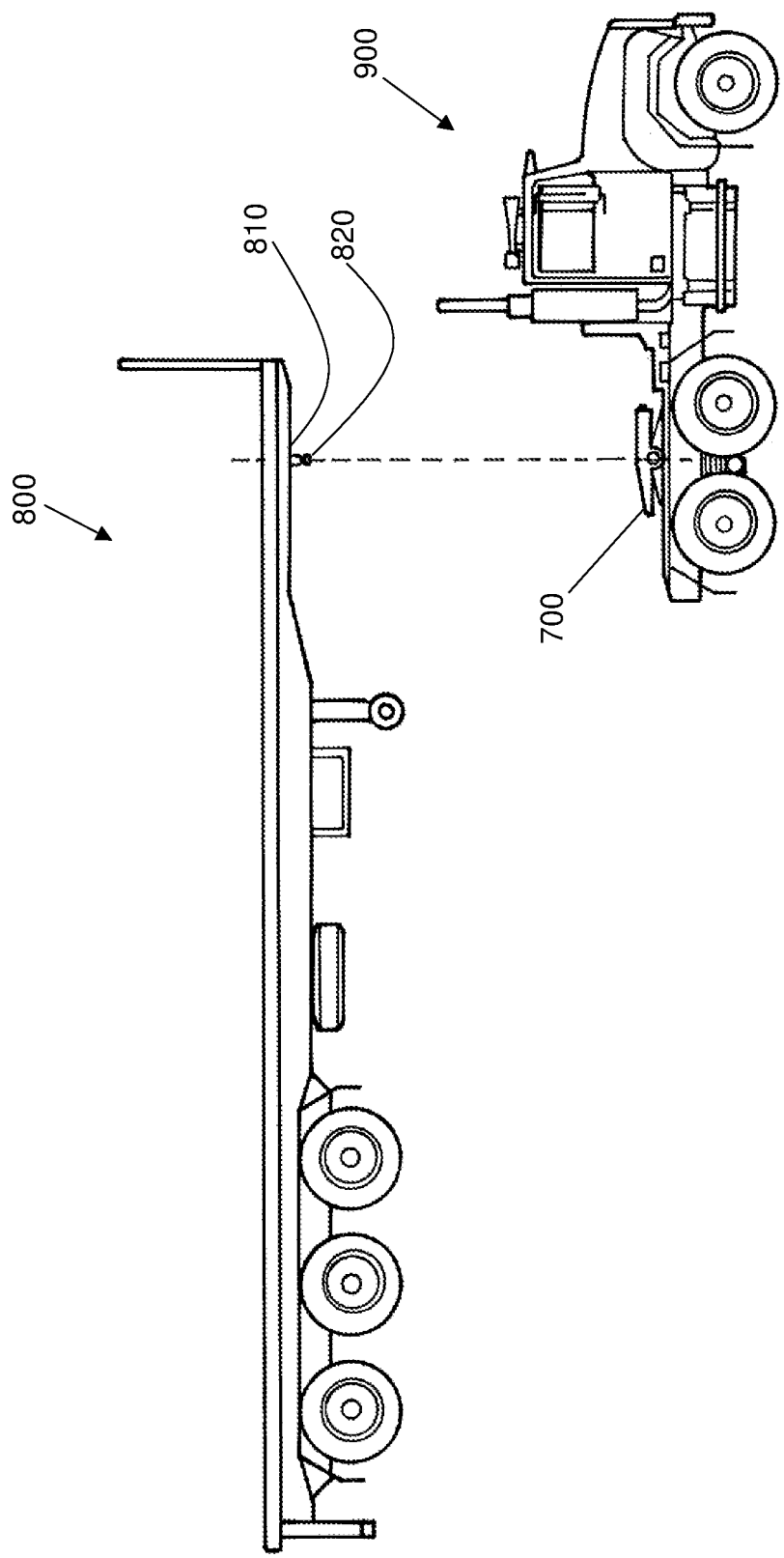
Figure 1 – Prior Art

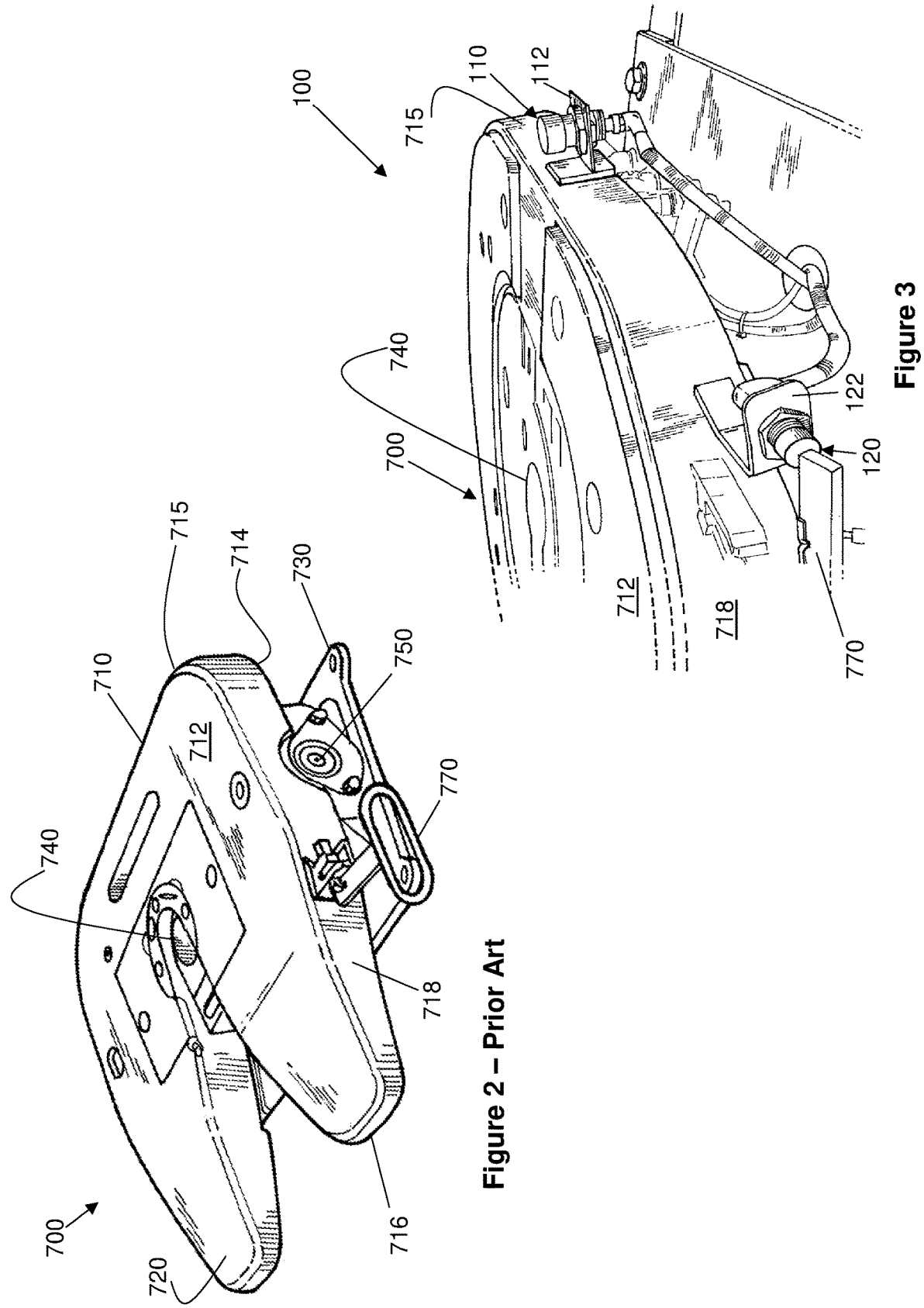

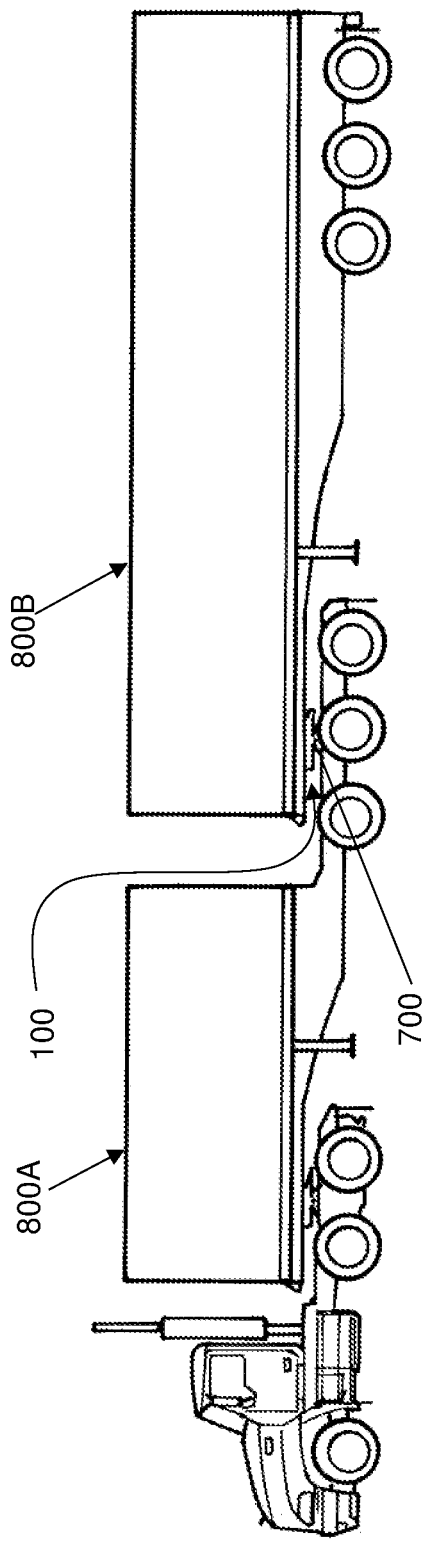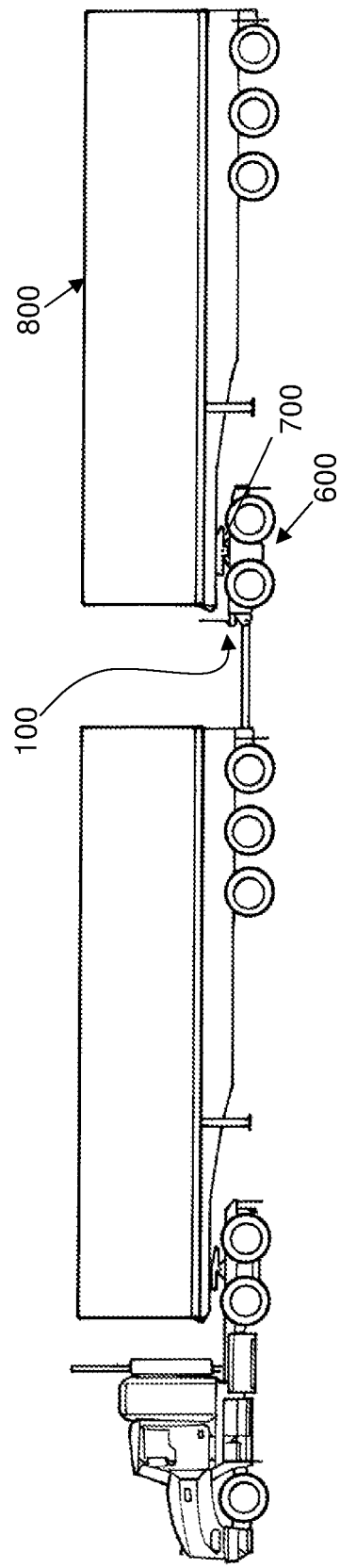

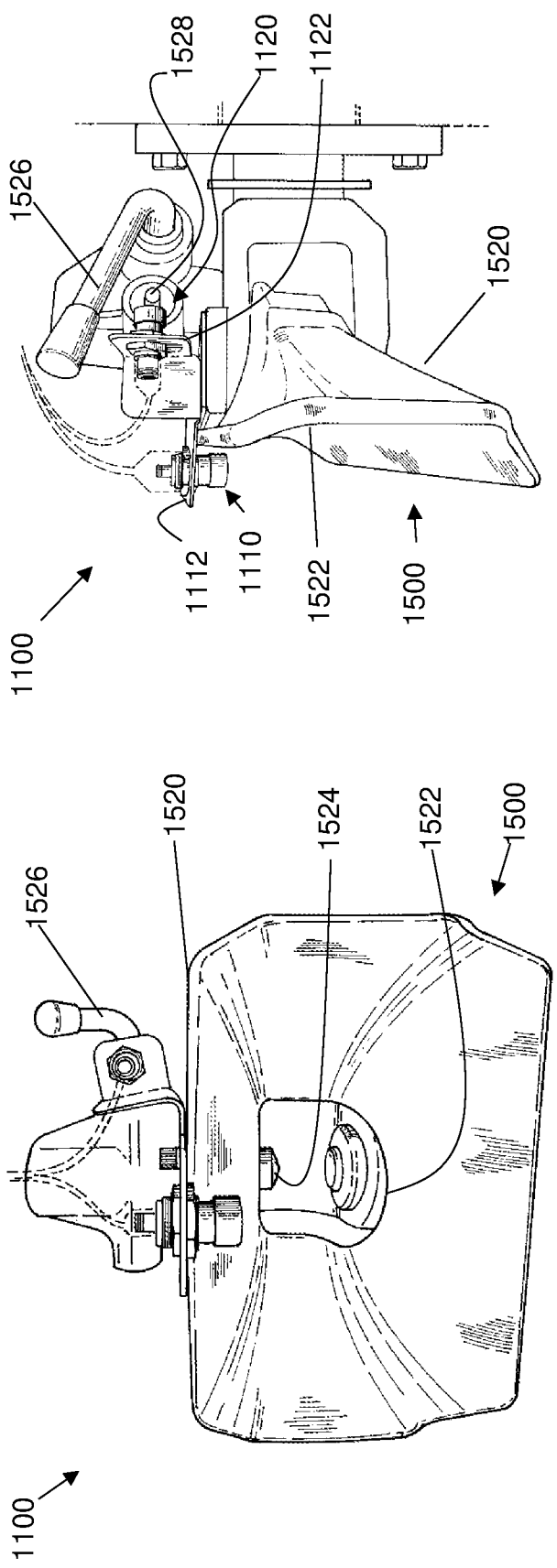
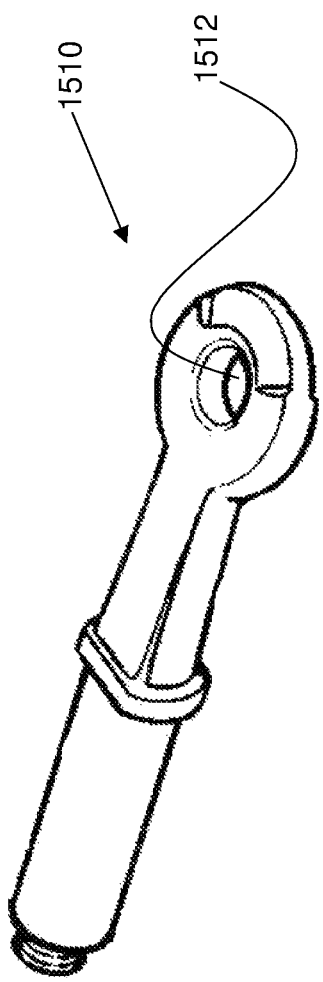
Figure 15A
Figure 15B
Figure 15C

TRAILER SAFETY SYSTEM AND METHODS OF USE THEREOF

CROSS-REFERENCE TO RELATED APPLICATIONS

This application is a national stage under 35 U.S.C. 371 of International Patent Application No. PCT/AU2019/050749, filed Jul. 17, 2019, which claims priority to Australian Patent Application No. 2018902585, filed Jul. 17, 2018, the disclosures of which are incorporated herein by reference in their entirety.

TECHNICAL FIELD

The present invention relates to a trailer safety system for monitoring a vehicle and trailer coupling or a trailer and trailer coupling and kits and methods of use thereof.

BACKGROUND

Heavy road transport vehicles, such as, e.g., a prime mover and semi-trailer combination or road train combination, are commonly used to transport freight over long distances all over the world.

Typically, such combinations involve the coupling of a prime mover to a semi-trailer or a semi-trailer to another semi-trailer with a wide coupling plate commonly referred to as a "fifth wheel coupling" or "turntable". In such couplings, the wide coupling plate is bolted to a rear portion of a chassis of the towing vehicle and couples with a kingpin extending from an underside of a front of the vehicle to be towed. To couple the vehicles, the towing vehicle is reversed towards the vehicle to be towed until the kingpin slides into a rear facing slot of the wide coupling plate and the jaws of the wide coupling plate lock around the kingpin.

Correct coupling is imperative to the safety of the driver, the vehicle and vehicles, structures and people near the coupled vehicle and trailer or trailers. For example, a faulty coupling can cause a semi-trailer to disconnect from a prime mover during transit, which can result in damage to other vehicles on the road and possibly injury or death to the drivers of these vehicles as well as damage to the trailer, loss of cargo and damage to surrounding buildings and structures.

Earlier trailer safety systems have been developed to monitor such couplings.

For example, Australian Innovation Patent No. 2016100223 B4 discloses a monitoring system having a plurality of coupling plate sensors, including a kingpin sensor and opposed tilt sensors located on each side of the coupling plate.

Likewise, International Patent Publication No. WO 2017/152234 A1 similarly discloses a monitoring system having a plurality of coupling plate sensors, including a kingpin sensor and opposed plate (pivot) sensors located on each side of the coupling plate.

The applicant has recognised that such monitoring systems are overly complicated and thus prone to failure, particularly when a kingpin sensor inevitably becomes covered in grease and/or metal filings or the vehicle and trailer or trailers to be coupled are not on flat ground.

For example, a greasy kingpin sensor may lead to existing systems reporting a false negative result, i.e., that the kingpin is not present when it is, or worse yet, may lead to the systems reporting a false positive, i.e., that the kingpin is present when it is not.

Likewise, the applicant has identified that such systems having pivot or tilt sensors located on opposed sides of the coupling plate are prone to reporting false negative results when coupling on uneven ground.

SUMMARY OF INVENTION

Embodiments of the present invention provide systems, a kit and methods for monitoring a vehicle and trailer coupling or a trailer and trailer coupling, which may at least partially address one or more of the problems or deficiencies mentioned above or which may provide the public with a useful or commercial choice.

According to a first aspect of the present invention, there is provided a trailer safety system for monitoring a vehicle and trailer coupling, said system including:

two sensors associated with a turntable of the vehicle, said sensors consisting of:
  a contact sensor positioned on a front-end edge of the turntable and configured to detect when a skid plate of the trailer is in contact with the turntable for engagement of a kingpin of the trailer with a pair of jaws of the turntable; and
  a locking sensor configured to detect when the locking mechanism is in a locked configuration; and
  a controller operatively connected to the two sensors and configured to receive output signals from the contact sensor and the locking sensor and to determine whether safe coupling has been achieved based on the output signals,
wherein said safe coupling is determined to have been achieved when the contact sensor detects contact between the skid plate and the turntable and the locking sensor detects that the locking mechanism is in the locked configuration after the engagement of the kingpin of the trailer with the pair of jaws of the turntable.

According to a second aspect of the present invention, there is provided a trailer safety system for monitoring a trailer coupling with another trailer, said system including:

two sensors associated with a turntable of a first trailer, said sensors consisting of:
  a contact sensor positioned on a front-end edge of the turntable and configured to detect when a skid plate of a second trailer is in contact with the turntable for engagement of a kingpin of the second trailer with a pair of jaws of the turntable of the first trailer; and
  a locking sensor configured to detect when the locking mechanism is in a locked configuration; and
  a controller operatively connected to the two sensors for receiving output signals from the contact sensor and the locking sensor and to determine whether safe coupling has been achieved based on the output signals,
wherein said safe coupling is determined to have been achieved when the contact sensor detects contact between the skid plate and the turntable and the locking sensor detects that the locking mechanism is in the locked configuration after engagement of the kingpin of the second trailer with the pair of jaws of the turntable of the first trailer.

According to a third aspect of the present invention, there is provided a trailer safety system for monitoring a vehicle and trailer coupling or a first trailer and second trailer coupling, said system including:

two sensors associated with a ringfeder bolt coupling, said sensors consisting of:
  a proximity sensor positionable on a coupling body of the vehicle or the first trailer and configured to detect when a towing eye of the trailer or the second trailer is in contact with, or at least in proximity to, the coupling body; and a locking sensor configured to detect when the locking mechanism is in a locked configuration; and a controller mountable on the vehicle or the trailer and configured to be operatively connected to the two sensors for receiving output signals from the proximity sensor and the locking sensor to determine whether safe coupling has been achieved based on the output signals, wherein said safe coupling is determined to have been achieved when the proximity sensor detects contact between, or at least proximity between, the towing eye and the coupling body and the locking sensor detects that the locking mechanism is in the locked configuration after a coupling pin of the coupling body of the vehicle or the first trailer has engaged and been received through the towing eye of the trailer or the second trailer.

According to a fourth aspect of the present invention, there is provided a trailer safety kit for monitoring a vehicle and trailer coupling or a first trailer and second trailer coupling, said kit including:

two sensors configured to be associated with a turntable of the vehicle or the first trailer, said sensors consisting of:
a contact sensor positionable on a front-end edge of the turntable and configured to detect when a skid plate of the trailer or the second trailer is in contact with the turntable of the vehicle or the first trailer; and
a locking sensor configured to detect when the locking mechanism is in the locked configuration; and a controller mountable on the vehicle or the first trailer and configured to be operatively connected to the two sensors for receiving output signals from the contact sensor and the locking sensor to determine whether safe coupling has been achieved based on the output signals, wherein said safe coupling is determined to have been achieved when the contact sensor detects contact between the skid plate and the turntable and the locking sensor detects that the locking mechanism is in the locked configuration after engagement of the kingpin of the trailer or the second trailer with the pair of jaws of the turntable of the vehicle or the first trailer.

According to a fifth aspect of the present invention, there is provided a trailer safety kit for monitoring a vehicle and trailer coupling or a first trailer and second trailer coupling, said kit including:

two sensors associated with a ringfeder bolt coupling, said sensors consisting of:
a proximity sensor positionable on a coupling body of the vehicle or the first trailer and configured to detect when a towing eye of the trailer or the second trailer is in contact with, or at least in proximity to, the coupling body; and
a locking sensor configured to detect when the locking mechanism is in a locked configuration; and a controller mountable on the vehicle or the trailer and configured to be operatively connected to the two sensors for receiving output signals from the proximity sensor and the locking sensor to determine whether safe coupling has been achieved based on the output signals, wherein said safe coupling is determined to have been achieved when the proximity sensor detects contact between, or at least proximity between, the towing eye and the coupling body and the locking sensor detects that the locking mechanism is in the locked configuration after a coupling pin of the coupling body of the vehicle or the first trailer has engaged and been received through the towing eye of the trailer or the second trailer.

According to a sixth aspect of the present invention, there is provided a trailer safety monitoring system for remotely monitoring safe coupling of a vehicle and trailer coupling or a first trailer and second trailer coupling, said system including:

two sensors configured to be associated with a turntable of the vehicle or the first trailer, said sensors consisting of:
a contact sensor positionable on a front-end edge of the turntable and configured to detect when a skid plate of the trailer or the second trailer is in contact with the turntable of the vehicle or the first trailer; and
a locking sensor configured to detect when the locking mechanism is in the locked configuration;

a controller mountable on the vehicle or the trailer and configured to be operatively connected to the two sensors for receiving output signals from the contact sensor and the locking sensor to determine whether safe coupling has been achieved based on the output signals; and at least one remotely accessible server operatively connected to the controller for receiving and monitoring data corresponding to the output signals from said sensors, said server configured to generate an alert when said data received from any one of the sensors or controller is indicative that the trailer or the second trailer is improperly coupled or not coupled, wherein said safe coupling is determined to have been achieved when the contact sensor detects contact between the skid plate and the turntable and the locking sensor detects that the locking mechanism is in the locked configuration after engagement of the kingpin of the trailer or the second trailer with the pair of jaws of the turntable of the vehicle or the first trailer.

According to a seventh aspect of the present invention, there is provided a trailer safety monitoring system for remotely monitoring safe coupling of a vehicle and trailer coupling or a first trailer and second trailer coupling, said system including:

the trailer safety system of the first or second aspects; and at least one remotely accessible server operatively connected to the controller for receiving and monitoring data corresponding to the output signals from said sensors, said server configured to generate an alert when said data received from any one of the sensors or controller is indicative that the trailer or the second trailer is improperly coupled or not coupled.

According to an eighth aspect of the present invention, there is provided a trailer safety monitoring system for remotely monitoring safe coupling of a vehicle and trailer coupling or a first trailer and second trailer coupling, said system including:

two sensors associated with a ringfeder bolt coupling, said sensors consisting of:
a proximity sensor positionable on a coupling body and configured to detect when a towing eye of the trailer or the second trailer is in contact with, or at least in proximity to, the coupling body of the vehicle or the first trailer; and
a locking sensor configured to detect when the locking mechanism is in a locked configuration;

a controller mountable on the vehicle or the trailer and configured to be operatively connected to the two sensors for receiving output signals from the proximity sensor and the locking sensor to determine whether safe coupling has been achieved based on the output signals; and at least one remotely accessible server operatively connected to the controller for receiving and monitoring data corresponding to the output signals from said sensors, said server configured to generate an alert when said data received from any one of the sensors or the controller is indicative that the trailer or the second trailer is improperly coupled or not coupled, wherein said safe coupling is determined to have been achieved when the proximity sensor detects contact, or at least proximity, between the towing eye and the coupling body and the locking sensor detects that the locking mechanism is in the locked configuration after a coupling pin of the coupling body of the vehicle or the first trailer has engaged and been received through the towing eye of the trailer or the second trailer.

According to a ninth aspect of the present invention, there is provided a trailer safety monitoring system for remotely monitoring safe coupling of a vehicle and trailer coupling or a first trailer and second trailer coupling, said system including:

the trailer safety system of the third aspect; and at least one remotely accessible server operatively connected to the controller for receiving and monitoring data corresponding to the output signals from said sensors, said server configured to generate an alert when said data received from any one of the sensors or controller is indicative that the trailer or the second trailer is improperly coupled or not coupled.

Advantageously, the trailer safety systems, kit and methods of the present invention provide a reliable and more robust system for monitoring safe couplings between vehicle and trailer or trailer and trailer. The use of only a contact/proximity sensor and a locking sensor greatly simplify and improve the system over existing systems. In particular, the absence of a kingpin sensor and tilt sensors eliminate false negative and, worst yet, false positive reporting of the position of the kingpin and enable the system to be reliably used on non-level ground. Lastly, the present invention provides a reliable solution for monitoring safe couplings in multiple trailer combinations.

The vehicle may preferably be a prime mover.

The trailer may include a trailer without a front axle also known as a "semi-trailer".

In some embodiments, the trailer may further include a detachable front-axle assembly also known as a "dolly" having a turntable. The dolly may be coupled to a lead trailer by a draw bar connection, including a ringfeder bolt coupling in some such embodiments.

The vehicle may be coupled to one or more trailers in various combinations.

For example, in some embodiments, the vehicle may couple to a single trailer via a turntable. In other embodiments, the vehicle may couple to a single trailer via a ringfeder bolt coupling as is known in the art.

In some embodiments, the vehicle may be coupled to a first trailer, or "A" trailer, having a turntable at a rear of the trailer, which is then coupled to a second trailer, or "B" trailer, via the turntable (this is known as a "B-double").

In further embodiments, the vehicle may be coupled to a first trailer, or "A" trailer, which may then be coupled to a second trailer, or "B" trailer, via a dolly having a turntable (this is known as a "road train"). A road train may typically have up to four trailers connected.

In embodiments including a ringfeder bolt coupling, the trailing trailer may be coupled to the leading vehicle or trailer by a draw bar connection having a towing eye at a front or forward end of the draw bar, the towing eye being configured to be at least partially received within and coupled to a coupling body at a rear end of the leading vehicle or trailer. The coupling body includes a rear-faced opening for at least partially receiving the towing eye and a sliding coupling pin configured to be received through a central opening or "eye" of the towing eye to couple the trailing trailer to the leading vehicle or trailer.

As used herein, the term "ringfeder bolt coupling" refers to a coupling system for coupling a trailing trailer to a rear of a leading vehicle or trailer. The system includes a coupling body that is mounted to a rear of a vehicle or trailer, typically to a cross member on the rear of the vehicle or trailer, and a towing eye, configured to be coupled to the coupling body, and attached to a front or forward end of a draw bar connection. The coupling body includes a rear-facing opening sized and shaped to at least partially receive the towing eye and a sliding coupling pin. The towing eye includes a central opening or "eye" for receiving the coupling pin when the coupling body and towing eye are coupled together.

The coupling system generally further includes an internal locking mechanism for sliding the coupling pin between a downwardly extending locked configuration in which the pin may extend through the central opening or "eye" of the towing eye (if present), and an unlocked configuration in which the pin is held clear of the central opening or "eye".

Typically, the pin may be slidable in a vertical orientation.

Sliding of the pin in the vertical orientation may be actuated by a locking handle extending from the coupling body.

In some embodiments, the coupling body may further include an indicator pin configured to provide an external indicator as to the configuration of the locking mechanism of the coupling body. The indicator pin may typically be in the form of a pin that may protrude from a surface of the coupling body when the locking mechanism is in the locked or unlocked configurations, preferably the former.

As used herein, the term "turntable" may refer to a wide coupling plate attached to a rear portion of the vehicle or a towing trailer and configured to couple with a kingpin extending from an underside of a front of a trailer to be towed. Generally, a prime mover, a dolly and some semi-trailers may include a turntable.

As shown by example in FIG. 1, a vehicle (900; a prime mover) and trailer (800; a semi-trailer) are typically coupled together by reversing the vehicle (900) towards the trailer (800) until the skid plate (810) and kingpin (820) of the trailer (800) engage with a turntable (700) of the vehicle (900).

FIG. 2 depicts a turntable (700) in greater detail. The turntable (700) generally includes a top plate (710) with opposed pin guides (720) defining an entry channel therebetween for receiving a kingpin. The entry channel leads to a kingpin locking aperture (740).

The top plate (710) is pivotally coupled to a base plate (730), which is fastened to a chassis of a vehicle, a dolly or a trailer. The top plate (710) is tiltable relative to the base plate (730) about pivot (750) between forward facing and rear facing positions.

The top plate (710) includes a planar upper surface (712), a rim (714) and at least one sidewall extending downwardly from the planar upper surface (712) to the rim (714). The at least one sidewall includes a front-end edge (715), an opposed rear-end edge (716) extending along and between the opposed pin guides (720), and a pair of opposed side edges (718).

The turntable (700) includes an internal locking mechanism for locking a kingpin within the kingpin locking aperture (740). The locking mechanism includes a pair of opposed moveable locking jaws for locking or clamping about a kingpin when in a locked configuration, or, alternatively, a pair of opposed open jaws having a locking pin or bar that slides across the entry channel when in a locked configuration to lock a kingpin within the open jaws and the kingpin locking aperture (740).

The internal locking mechanism may be coupled to a locking handle (770) extending from a side of the top plate (710). The locking mechanism is moveable between the locked configuration and an unlocked configuration as indicated by a position of the locking handle (770) relative to the turntable (700). In the locked configuration, the locking handle (770) may be retracted into the top plate (710). Conversely in the unlocked configuration, the locking handle (770) may protrude from the top plate (710) of the turntable (700).

As indicated above, in some embodiments the system includes two sensors associated with a turntable, namely a contact sensor configured to detect when a skid plate of a trailer is in contact with the turntable and a locking sensor configured to detect when the locking mechanism of the turntable is in the locked configuration, preferably by a position of the locking handle relative to the turntable.

In other embodiments, the system includes two sensors associated with a ringfeder bolt coupling, namely a proximity sensor configured to detect when a towing eye is at least in proximity to the coupling body and a locking sensor configured to detect when the locking mechanism of the coupling body is in the locked configuration, typically by either a position of the locking handle relative to the coupling body or a position of an indicator pin.

The sensors may be shielded to prevent erroneous readings.

The sensors may be retro-fitted to an existing turntable or ringfeder bolt coupling or a turntable or ringfeder bolt coupling may be manufactured including the sensors.

The sensors may be of any suitable size, shape and form. Each of the sensors may be of the same or differing types, preferably the same.

In some embodiments, the sensors may each be a tactile sensor configured to detect a physical interaction, such as, e.g., a capacitive sensor, a piezoresistive sensor, a piezoelectric sensor or an elastoresistive tactile sensor.

In other embodiments, the sensors may each be ultrasound sensors.

In yet other embodiments, the sensors may each be laser sensors, preferably diffuse reflection sensors.

In yet further embodiments, the sensors may each be analogue proximity sensors utilising a magnetic field reading.

In preferred embodiments, however, the sensors may each be a proximity sensor configured to detect the presence of a nearby object, such as, e.g., a capacitive sensor, a photoelectric sensor or an inductive proximity sensor. Typically, in such embodiments, each sensor may be a photoelectric sensor or an inductive proximity sensor, preferably an inductive proximity sensor or a diffused photoelectric sensor.

For example, in some embodiments, the contact sensor may be a proximity sensor positioned on the turntable and configured to detect the presence of the skid plate of the trailer and thus contact between the skid plate and the turntable. In preferred embodiments, the contact sensor may be positioned to sense across the upper surface of the top plate of the turntable to detect contact between the turntable and the skid plate as the prime mover, dolly or trailer with a turntable reverses towards the trailer to be towed.

Advantageously, the present inventors have found that by configuring the contact sensor to detect contact between the skid plate of a trailer and the turntable, the contact sensor ensures that the kingpin does not overshoot the turntable but rather that the turntable and/or the trailer are correctly positioned such that the kingpin will be correctly received in the entry channel for engagement in the kingpin locking aperture.

Likewise, in other embodiments, the proximity sensor may be positioned on or adjacent an edge defining the rear-facing opening of the coupling body and configured to detect the presence of the towing eye of the trailer as it enters the rear-facing opening of the coupling body. In preferred embodiments, the proximity sensor may be positioned along an upper edge of the rear-facing opening of the coupling body to detect the towing eye as it enters the rear-facing opening when a prime mover or leading trailer reverses towards the towing eye.

The contact or proximity sensor may be shielded, or partly shielded, to prevent erroneous readings.

The contact or proximity sensor may have a nominal range (i.e., maximum distance that the sensor can detect) configured to detect contact between the turntable and the skid plate of the trailer or the presence of the towing eye within the rear-facing opening of the coupling body. For example, the contact or proximity sensor may have a nominal range of about 0 mm, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, about 110 mm, about 120 mm, about 130 mm, about 140 mm, 150 mm, about 160 mm, about 170 mm, about 180 mm, about 190 mm, about 200 mm, about 210 mm, about 220 mm, about 230 mm, about 240 mm, about 250 mm, about 260 mm, about 270 mm, about 280 mm, about 290 mm, about 300 mm, about 310 mm, about 320 mm, about 330 mm, about 340 mm, about 350 mm, about 360 mm, about 370 mm, about 380 mm, about 390 mm, about 400 mm, about 410 mm, about 420 mm, about 430 mm, about 440 mm, about 450 mm, about 460 mm, about 470 mm, about 480 mm, about 490 mm, about 500 mm, about 510 mm, about 520 mm, about 530 mm, about 540 mm or even about 550 mm. Preferably, the nominal range of the contact or proximity sensor may be adjustable to enable the sensor to be precisely calibrated to detect as soon as the skid plate of the trailer is in contact with the turntable or the towing eye enters the rear-facing opening of the coupling body.

As indicated above, the contact sensor may typically be positioned on a front-end edge of the turntable, preferably a front-end edge of the top plate of the turntable. Likewise, the proximity sensor may be located along an upper edge of the rear-facing opening of the coupling body.

Generally, the contact sensor may be located at any suitable location along or across the front-end edge of the turntable. For example, in some embodiments, the contact sensor may be centrally positioned (i.e., mid-way) across the front-end edge. In other embodiments, the contact sensor may be positioned in an off-centre position across the front-end edge, i.e., near a side edge.

The contact sensor may be directly or indirectly mounted to the front-end edge, preferably the latter. Typically, the contact sensor may be mounted to the front-end edge of the turntable by a bracket or mount, for example. The bracket or mount may be fastened to the front-end edge by one or more mechanical fasteners (e.g., threaded fasteners and the like) and/or a chemical fastener (e.g., adhesive). In some embodiments, the bracket or mount may be fastened to the front-end edge of the turntable with a metal epoxy glue.

The proximity sensor may also be directly or indirectly mounted to the upper edge of the rear-facing opening of the coupling body, preferably the latter. Generally, the proximity sensor may also be mounted by a bracket or mount. The bracket or mount may be fastened to an outer surface of the edge defining the rear-facing opening of the coupling body such that the proximity sensor extends downwardly immediately before the rear-facing opening. The bracket or mount may be fastened to the coupling body by one or more mechanical fasteners (e.g., threaded fasteners and the like) and/or a chemical fastener (e.g., adhesive). Again, in some embodiments, the bracket or mount may be fastened in place with a metal epoxy glue.

Like the contact sensor, the locking sensor may also preferably be a proximity sensor. In some embodiments, the locking sensor may be configured to detect the presence of the locking handle for thus detecting that the locking mechanism is in the locked configuration after engagement of the kingpin of the trailer with the jaws of the locking mechanism of the turntable. In other embodiments, the locking sensor may be configured to detect the presence of the locking handle for thus detecting that the locking mechanism is in the locked configuration after engagement of the coupling pin of the coupling body with the central opening or eye of the towing eye.

Again, like the contact sensor, the locking sensor may be shielded, or partly shielded, to prevent erroneous readings.

The locking sensor may have a nominal range configured to detect the proximity of the locking handle to the locking sensor when in the locked configuration and to differentiate when the locking handle is in the unlocked configuration. For example, the locking sensor may have a nominal range of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, about 125 mm, about 130 mm, about 135 mm, about 140 mm, about 145 mm, or even about 150 mm. Preferably, the nominal range of the locking sensor may be adjustable to enable the sensor to be precisely calibrated to detect as soon as the locking handle of the locking mechanism is in a locking position indicative that the locking mechanism is in the locking configuration and thus that the kingpin is engaged by the turntable.

In some embodiments, the locking sensor may be associated with a side of the turntable, preferably adjacent the locking handle of the turntable. Generally, the locking sensor may be located to sense a position of the locking handle indicative that the locking mechanism is in the locked configuration.

In such embodiments, the sensor may be directly or indirectly mounted to a side edge or front-end edge of the turntable, preferably at a corner defined between the side edge and the front-end edge of the top plate of the turntable. Typically, the locking sensor may be mounted by a bracket or mount, for example. The bracket or mount may be fastened to the side edge and/or front-end edge by one or more mechanical fasteners (e.g., threaded fasteners and the like) and/or a chemical fastener (e.g., adhesive). In some embodiments, the bracket or mount may be fastened to the side of the top plate of the turntable with a metal epoxy glue.

In particular, the inventors have found that fastening the locking sensor to a side edge of a top plate of a turntable rather than a bottom plate results in the locking sensor being less prone to damage.

In some embodiments, the locking sensor may be positioned to detect the presence of the locking handle in front of the sensor, being indicative that the locking handle has been retracted or pushed into the turntable and thus that the locking mechanism is in the locked configuration.

In other embodiments concerning the ringfeder bolt coupling, the locking sensor may be associated with a side of the coupling body, preferably adjacent the locking handle of the coupling body. Generally, the locking sensor may be located to sense a position of the locking handle or the indicator pin indicative that the locking mechanism is in the locked configuration, preferably the latter.

In such embodiments, the sensor may be directly or indirectly mounted to the coupling body, preferably to an outer surface of the upper edge defining the rear-facing opening of the coupling body. Again, the locking sensor may typically be mounted by a bracket or mount, for example. The bracket or mount may be fastened to the upper edge by one or more mechanical fasteners (e.g., threaded fasteners and the like) and/or a chemical fastener (e.g., adhesive). In some embodiments, the bracket or mount may be fastened to the upper edge with a metal epoxy glue.

Each of the sensors may transmit an output signal to the controller, typically an electrical signal.

The controller may be operatively connected to the two sensors and configured to receive the output signals and determine whether safe coupling has been achieved based on the output signals received.

The controller may be operatively connected to the sensors in any suitable way. For example, the sensors and the controller may be in communication by way of suitable electrical wiring. Alternatively, the sensors may be in communication with the controller by way of a wireless connection, such as, e.g., a wireless link.

The controller may be of any suitable size, shape and form. The controller may be remotely or adjacently located relative to the sensors. For example, in some embodiments, the controller may be located in a cab of the vehicle. In other embodiments, the controller may be externally located and/or mounted on a chassis of the vehicle or trailer having a turntable or ringfeder bolt coupling.

For example, in some embodiments, the controller may be mounted to, or integrated with, a dashboard of the vehicle having the turntable or the ringfeder bolt coupling.

The controller may include a housing. The housing may be of any suitable size, shape and construction. Typically, the housing may have a polygonal shape, preferably the shape of a rectangular prism.

The controller may include a user interface.

The user interface may include a signal generator for generating one or more alert signals for alerting a driver.

In some embodiments, the signal generator may generate an alert signal when a trailer is improperly coupled or not coupled, for example. In other embodiments, the signal generator may generate an alert signal when a trailer is correctly coupled.

In other embodiments, the signal generator may generate at least one alert signal when an output signal is received from the contact sensor indicative that the skid plate is in contact with the turntable, and the at least one alert signal may be maintained until an output signal is received from the locking sensor indicative that the locking mechanism is in the locked configuration, thus confirming that the trailer has been safely coupled.

The signal generator may include at least one audio signalling device for generating at least one audio signal. The audio signalling device may be in the form of a buzzer, a beeper, a chirper, a siren or the like, and the at least one audio signal may be a buzz, a beep, a chirp, a siren or the like, for example. The audio signal may be a synthesized message or playback of a pre-recorded message, such as, e.g., "INCORRECT COUPLING", "TRAILER DETECTED", "SAFE COUPLING ACHIEVED", "LOCKING MECHANISM UNLOCKED", "LOCKING MECHANISM LOCKED", "TURNTABLE IN CONTACT", or even "SYSTEM FAULT" or "REVERT TO MANUAL COUPLING" for when the reporting of system feedback and errors. Preferably, the at least one audio signal may be a buzz, a beep, a siren or the like, or a combination thereof.

In some embodiments, the at least one audio signalling device may be capable of emitting different types of audio signals to alert a driver when a trailer is correctly coupled and incorrectly coupled, for example.

In other embodiments, the signal generator may include two or more audio signalling devices configured to emit different audio signals. The two or more audio signalling devices may be selectively activated by the controller based on the output signals received from the two sensors.

In some embodiments, the signal generator may include at least one visual signalling device for generating at least one visual signal. The visual signal may preferably be a light, and the at least one visual signalling device may preferably be a light source, such as, e.g., a light-emitting-diode ("LED"). For example, the visual signal may include one or more flashing lights, constant lights or coloured lights or any combination thereof. In some such embodiments, the signal generator may generate a green light to indicate that a trailer is correctly coupled and a red light to indicate that a trailer is incorrectly coupled. Preferably, the at least one visual signalling device may be in the form of one or more LEDs capable of emitting light in different colours.

In preferred embodiments, the signal generator may include both the at least one audio signalling device capable of emitting one or more types of audio signal, such as, e.g., a buzz, a beep, a siren or the like, or any combination thereof, and the least one visual signalling device in the form of one or more LEDs capable of emitting light or lights in different colours.

In some embodiments, the user interface of the controller may include at least one display. The display may display the status of a coupling based on the output signals of the sensors. The display may be of any suitable type or form. For example, the display may be a liquid crystal display (LCD), a plasma display, or an LED display.

In some such embodiments, the at least one display may be configured to display at least one visual signal to alert a driver. For example, a visual message may be displayed, such as, e.g., "INCORRECT COUPLING", "TRAILER DETECTED" or "SAFE COUPLING ACHIEVED". In some further embodiments, the display may provide system feedback and errors, such as, e.g., "SYSTEM FAULT" or "REVERT TO MANUAL COUPLING".

In some such embodiments, the at least one display may include a touchscreen to allow a driver to interact with the controller and thus control various aspects of operation of the system. For example, the driver may interact with the controller to silence or mute a signal.

In some embodiments, the controller may further include a programmable logic controller (PLC), the PLC being configured to communicate with the two sensors and the signal generator. The PLC may be a single PLC, a PLC stack having a master and slaves, a modular PLC rack, or another arrangement. For example, in some embodiments, modular PLCs may be used for specific critical functions. In other embodiments, the PLC may enable multiple semi-trailers connected to a vehicle to be monitored.

In some embodiments, the controller may include a communications module for connecting the controller and the system to the remotely accessible server or an external device, such as, e.g., an external processing device (e.g., computer, tablet, smart phone, smart watch or PDA), an external display, an external printer or a storage device (e.g., a hard drive). The controller and the system may be connected to an external device in any suitable way.

For example, the communication module may be in the form of a port or access point (e.g., a USB or a mini-USB port) such that the controller may be connected to an external device using a suitable cable.

For example, the communication module may be in the form of a wireless communication module, such as, e.g., a wireless network interface controller, such that the controller may wirelessly connect to the remotely accessible server or external device through a wireless network (e.g., Wi-Fi (WLAN) communication, Satellite communication, RF communication, infrared communication, or Bluetooth™).

Typically, the communications module may be a modem, preferably a cellular or radio modem.

Advantageously, in some such embodiments, the system may wirelessly communicate with an external vehicle tracking device, such as, e.g., fleet vehicle tracking software. In such embodiments, the system may alert an operations manager or fleet controller if a vehicle is operating with incorrectly or partially coupled trailer(s).

In some embodiments, the controller may include a microcomputer, including one or more processors and a memory. The one or more processors may be low power processors. The processors may include multiple inputs and outputs coupled to other electronic components of the controller.

For example, the processors may have inputs coupled to the sensors. Likewise, the processors may have an output coupled to the signal generator.

If present, the processors may have an input and/or an output coupled to the communications module for transmitting and receiving data from an external device and/or the at least one display.

In some embodiments, the controller may include a power source for powering the electrical components of the system. In some such embodiments, the power source may include an on-board power source, such as, e.g., one or more batteries. In other such embodiments, the power source may include a photovoltaic solar panel, an inverter and one or more batteries for storing electricity generated and from which the controller and system components may draw power.

In other embodiments, the controller may receive power from an external source for powering the electrical components of the system. For example, in some such embodiments, the controller may receive power from the vehicle.

In some embodiments, the system may further include a positioning system for determining a position of a vehicle. The positioning system may operatively connected to the controller. The positioning system may communicate with the external vehicle tracking device (software) mentioned above, preferably wirelessly. The positioning system may be a global navigation satellite system (GNSS), including a GNSS receiver associated with a GNSS antenna, preferably a GPS receiver and GPS antenna.

In some such embodiments, the positioning system may be contained within the housing of the controller. In other such embodiments, the positioning system may be a separate unit connected to the controller by electrical wiring.

In some embodiments, the system may further include at least one camera and a display operatively connected to the at least one camera for displaying the at least one image. The at least one camera may be positioned near the turntable or ringfeder bolt coupling and may be configured to capture the at least one image of the locking mechanism locking a kingpin of a trailer being coupled within the kingpin locking aperture or a coupling bolt engaging a towing eye of a trailer being coupled. The display may preferably be located in a cab of the prime mover and may advantageously enable the driver to visually verify that the kingpin or coupling pin is properly seated or locked in position.

The at least one camera may be a digital camera, preferably capable of capturing both still images and video of the jaws of the locking mechanism.

The at least one camera may be directly or indirectly mounted near the turntable, preferably at an elevated position and facing downwards towards the turntable. For example, the at least one camera may be mounted to part of the vehicle including a turntable by a bracket or mount, for example. The bracket or mount may be fastened to an adjacent structure by one or more mechanical fasteners (e.g., threaded fasteners and the like) and/or a chemical fastener (e.g., adhesive), preferably the latter. In some embodiments, the bracket or mount may be fastened to the adjacent structure with a metal epoxy glue.

In preferred embodiments, the display may coincide with the at least one display of the controller or the user interface. However, it is envisaged that the display may also be distinct from the user interface of the controller and may be mounted in the cab of the prime mover.

Like with the sensors and the controller, the at least one camera may be operatively connected to at least one display of the controller in any suitable way. For example, the at least one camera and the controller may be in communication by way of suitable electrical wiring. Alternatively, the at least one camera may be in communication with the controller by way of a wireless connection, such as, e.g., a wireless link.

The remotely accessible server may be any appropriate server computer, distributed server computer, cloud-based server computer, server computer cluster or the like. The server may also typically include one or more processors and one or more memory units containing executable instructions/software to be executed by the one or more processors. Generally, the server may be in communication with at least one database.

For example, in some embodiments, the server may be in communication with a fleet database containing a plurality of coupling records for each truck trailer coupling and/or trailer coupling being monitored. The server may preferably be linked to or may maintain the fleet database. Each coupling record may include an identifier. Each coupling record may further include a past record of the data output by the respective sensors for its coupling.

In some embodiments, the remotely accessible server may additionally collect and record data output from said sensors in the coupling database, preferably against a coupling record corresponding to a respective coupling.

In some embodiments, the remotely accessible server may further continuously or periodically monitor the coupling database for changes in the data output for any one of the plurality of sensors. The remotely accessible server may generate an alert when a change in the data output is indicative of a change in sensor operational status, such as, e.g., a sensor failing or failing sensor (imminent failure). The alert may be generated to a computing device of a fleet controller or the like. The alert may be an electronic notification. A failure may include, inter alia, an open circuit, a short circuit or a power source failure.

Responsive to the remotely accessible server identifying data indicative of a trailer being improperly coupled or not coupled, the server may generate and transmit an alert to a computing device of a fleet controller or the like advising of the improper or non-coupling. In such embodiments, the alert may be generated after a period of time has elapsed and the drive has yet to correct the coupling. The period of time may be about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 30 minutes, about 40 minutes, about 50 minutes or even about 60 minutes.

An alert generated by the remotely accessible server may preferably be an electronic notification and may be effected by way of Short Message Server (SMS) protocol, Unstructured Supplementary Service Data (USSD) protocol, over a secure Internet connection, or by way of data communication enabled by a software application installed on the computing device, for example.

The computing device may include a computer, a tablet, a smart phone, a smart watch or a PDA, for example. The computing device may be connected to the at least one remotely accessible server by a wired connection or a wireless connection via a wireless network (e.g., Wi-Fi (WLAN) communication, RF communication, infrared communication, or Bluetooth™), preferably the latter.

In some embodiments, the system may include software configured to be run on the sensors, the controller, the remotely accessible server and/or the computing device of the fleet controller or the like. The software may preferably be interactive. In some such embodiments, the software may be in the form of an application (i.e., an app) configured to be run on a smart phone, a tablet or other mobile computing device, for example.

In other embodiments, the remotely accessible server may include a web server providing a graphical user interface through which the operator or the like may interact with the system and the remotely accessible server. The web server may accept requests, such as HTTP requests and server responses, such as HTTP responses, along with optional data content, such as web pages (e.g., HTML documents) and linked objects. Generally, the web server may enable the fleet controller and the like to receive and transmit communications with the remotely accessible server and with the sensors and the controller via the remotely accessible server.

According to a tenth aspect of the present invention, there is provided a method of assisting in safe coupling of a trailer to a vehicle, said method including:

determining when a skid plate of the trailer is aligned and resting on top of a turntable of the vehicle based on an output signal of a contact sensor positioned on a front-end edge of the turntable and configured to detect when the skid plate is in contact with the turntable;

determining when a kingpin of the trailer engages with a pair of jaws of the turntable based on an output signal of a locking sensor configured to detect when the locking mechanism is in a locked configuration, wherein said locking mechanism transitions to the locked configuration upon engagement of the kingpin and the pair of jaws; and alerting a driver in a cab of the vehicle when safe coupling has been achieved, said alerting including an alert signal generated by a controller operatively connected to the contact sensor and the locking sensor and configured to receive output signals from the contact sensor and the locking sensor, wherein said safe coupling is determined to have been achieved when the contact sensor detects contact between the skid plate and the turntable and the locking sensor detects that the locking mechanism is in the locked configuration.

According to an eleventh aspect of the present invention, there is provided a method of assisting in safe coupling of a trailer to a vehicle, said method including:

determining when a towing eye of the trailer is aligned and at least partially received in a coupling body of the vehicle based on an output signal of a proximity sensor positioned on the coupling body and configured to detect when the towing eye is in contact with, or at least in proximity to, the coupling body;

determining when coupling pin of the coupling body engages with and is received through the towing eye based on an output signal of a locking sensor configured to detect when the locking mechanism is in a locked configuration, wherein said locking mechanism transitions to the locked configuration upon engagement of the coupling pin with the towing eye; and alerting a driver in a cab of the vehicle when safe coupling has been achieved, said alerting including an alert signal generated by a controller operatively connected to the proximity sensor and the locking sensor and configured to receive output signals from the proximity sensor and the locking sensor, wherein said safe coupling is determined to have been achieved when the proximity sensor detects contact, or at least proximity, between the towing eye and the coupling body and the locking sensor detects that the locking mechanism is in the locked configuration.

The methods of the tenth and eleventh aspects may include one or more characteristics or features of the system as hereinbefore described.

The method may be initiated by a driver reversing the vehicle towards the trailer and/or raising or lowering the vehicle to ensure that the turntable is at a correct height to contact the skid plate of the trailer or the coupling body is at a correct height to receive the towing eye. The vehicle's height relative to the trailer may be adjusted by adjusting the air bag suspension of the vehicle, for example.

Once the vehicle is correctly positioned for engagement between the turntable and the skid plate of the trailer or between the coupling body and towing eye, the driver may continue to reverse the vehicle until contact or proximity is determined by the contact sensor or proximity sensor.

Upon detecting contact or proximity, the contact sensor or proximity sensor may transmit an output signal to the controller.

Responsive to the controller receiving the output signal, the controller may generate a first alert signal for the driver via the signal generator of a user interface of the controller. Typically, the first alert signal may be in the form of at least one visual signal and/or at least one audio signal, such as, e.g., a red light and a buzz.

For example, in preferred embodiments, the first alert signal may include a visual signal in the form of a red light and an audio signal in the form of a buzz.

If no first alert signal is generated, the driver may need to raise or reposition the vehicle relative to the trailer until the first alert signal is generated indicating that the turntable of the vehicle is correctly positioned for coupling with the kingpin of the trailer or the coupling body of the vehicle is correctly position for coupling with the towing eye of the trailer.

Upon generation of the first alert signal, the driver may continue to reverse the vehicle towards the trailer until the kingpin of the trailer engages with the pair of jaws of the turntable or the coupling pin engages with the towing eye.

Engagement of the kingpin by the pair of jaws of the turntable may typically cause the locking mechanism of the turntable to transition to the locked configuration and the locking handle of the locking mechanism to at least partially retract into the turntable.

Likewise, in some embodiments, engagement of the coupling pin of the coupling body with the towing eye may typically cause the locking mechanism of the ringfeder bolt coupling to transition to the locked configuration and optionally the locking handle of the locking mechanism to rotate to a position indicative of the locked configuration.

In other embodiments, engagement of the coupling pin of the coupling body with the towing eye may typically cause the locking mechanism of the ringfeder bolt coupling to transition to the locked configuration and the indicator pin to protrude outwardly from the coupling body indicative of the locked configuration.

Upon detecting the presence of the locking handle in a retracted state or locked position or the indicator pin protruding outwardly, the locking sensor may transmit an output signal to the controller indicating that the locking mechanism is in the locked configuration.

Responsive to the controller receiving the output signal from the locking sensor, the controller may cause the signal generator of the user interface to generate a second alert signal for the driver and/or kill the first alert signal. For example, the signal generator may cease to generate the first alert signal and instead may generate the second alert signal.

Like the first alert signal, the second alert signal may include at least one visual signal and/or at least one audio signal, such as, e.g., a green light and a buzz.

In preferred embodiments, the second alert signal may include a visual signal only in the form of a green light.

The generation of the second alert signal may be indicative that said safe coupling has been achieved.

Advantageously, by maintaining the first alert signal until the locking mechanism transitions to the locked configuration, the driver is continually alerted that the trailer is not yet safely coupled. This is particularly important for tired drivers and may assist in keeping drivers focused until safe coupling is achieved.

In embodiments in which the system includes at least one camera, the method may further include visually verifying that the kingpin has been correctly engaged by the turntable via a display in a cab of the vehicle.

According to a twelfth aspect of the present invention, there is provided a method of assisting in the safe coupling of multiple trailers together with a vehicle, said method including:

determining when a skid plate of a second trailer is aligned and resting on top of a turntable of a first trailer based on an output signal of a contact sensor positioned on a front-end edge of the turntable and configured to detect when the skid plate is in contact with the turntable;

determining when a kingpin of the second trailer engages with a pair of jaws of the turntable based on an output signal of a locking sensor configured to detect when the locking mechanism is in a locked configuration, wherein said locking mechanism transitions to the locked configuration upon engagement of the kingpin and the pair of jaws; and alerting a driver of the vehicle when safe coupling has been achieved, said alerting including an alert signal generated by a controller operatively connected to the contact sensor and the locking sensor and configured to receive output signals from the contact sensor and the locking sensor, wherein said safe coupling is determined to have been achieved when the contact sensor detects contact between the skid plate and the turntable and the locking sensor detects that the locking mechanism is in the locked configuration.

According to a thirteenth aspect of the present invention, there is provided a method of assisting in the safe coupling of multiple trailers together with a vehicle, said method including:

determining when a towing eye of the trailer is aligned and at least partially received in a coupling body of the vehicle based on an output signal of a proximity sensor positioned on the coupling body and configured to detect when the towing eye is in contact with, or at least in proximity to, the coupling body;

determining when coupling pin of the coupling body engages with and is received through the towing eye based on an output signal of a locking sensor configured to detect when the locking mechanism is in a locked configuration, wherein said locking mechanism transitions to the locked configuration upon engagement of the coupling pin with the towing eye; and alerting a driver in a cab of the vehicle when safe coupling has been achieved, said alerting including an alert signal generated by a controller operatively connected to the proximity sensor and the locking sensor and configured to receive output signals from the proximity sensor and the locking sensor, wherein said safe coupling is determined to have been achieved when the proximity sensor detects contact, or at least proximity, between the towing eye and the coupling body and the locking sensor detects that the locking mechanism is in the locked configuration.

The methods of the twelfth or thirteenth aspects may include one or more characteristics or features of the system and/or the method as hereinbefore described.

Again, the method may be initiated by a driver reversing the vehicle and the first trailer towards the second trailer and/or raising or lowering the first trailer to ensure that the turntable or coupling body is at a correct height to contact the skid plate or towing eye of the second trailer. The first trailer's height relative to the second trailer may be adjusted by adjusting the air bag suspension of the first trailer, for example.

In some embodiments, the first trailer may be a dolly having a turntable for coupling with the second trailer.

In other embodiments, the first trailer may be a semi-trailer having a rear turntable for coupling with the second trailer.

Once the first trailer is correctly positioned for engagement between the turntable and the skid plate or the coupling body and the towing eye, the driver may continue to reverse the vehicle and the first trailer until contact or proximity is determined by the contact sensor or proximity sensor.

Upon detecting contact or proximity, the contact sensor or proximity sensor may transmit an output signal to the controller. The controller may preferably be mounted to a location at or near a front end of the first trailer.

Responsive to the controller receiving the output signal from the contact sensor or proximity sensor, the controller may generate a first alert signal for the driver via the signal generator of the user interface of the controller. Typically, the first alert signal may be in the form of at least one visual signal and/or at least one audio signal, such as, e.g., a red light and a buzz.

For example, in preferred embodiments, the first alert signal may include a visual signal in the form of a red light.

If no first alert signal is generated, the driver may need to raise or reposition the first trailer relative to the second trailer until the first alert signal is generated indicating that the turntable or coupling body of the first trailer is correctly positioned for coupling with the kingpin or towing eye of the second trailer.

Upon generation of the first alert signal, the driver may continue to reverse the first trailer towards the second trailer until the kingpin of the second trailer engages with the pair of jaws of the turntable or the towing eye of the second trailer is engaged by the coupling pin of the coupling body.

Engagement of the kingpin by the pair of jaws of the turntable may typically cause the locking mechanism of the turntable to transition to the locked configuration and the locking handle of the locking mechanism to at least partially retract into the turntable.

Likewise, in some embodiments, engagement of the coupling pin of the coupling body with the towing eye may typically cause the locking mechanism of the ringfeder bolt coupling to transition to the locked configuration and optionally the locking handle of the locking mechanism to rotate to a position indicative of the locked configuration.

In other embodiments, engagement of the coupling pin of the coupling body with the towing eye may typically cause the locking mechanism of the ringfeder bolt coupling to transition to the locked configuration and the indicator pin to protrude outwardly from the coupling body indicative of the locked configuration.

Upon detecting the presence of the locking handle in a retracted state or locked position or the indicator pin protruding outwardly, the locking sensor may transmit an output signal to the controller indicating that the locking mechanism is in the locked configuration.

Responsive to the controller receiving the output signal from the locking sensor, the controller may cause the signal generator of the user interface to generate a second alert signal for the driver and/or kill the first alert signal. For example, the signal generator may cease to generate the first alert signal and instead may generate the second alert signal.

Like the first alert signal, the second alert signal may include at least one visual signal and/or at least one audio signal, such as, e.g., a green light and a buzz.

In preferred embodiments, the second alert signal may include a visual signal only in the form of a green light.

The generation of the second alert signal may be indicative that said safe coupling has been achieved.

It is envisaged that a driver coupling a multiple trailer combination may be able to confirm safe coupling has been achieved between adjacent trailers via a quick visual inspection of the respective controllers when connecting airlines and electrical cables between the trailers.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows:

FIG. 1 is a diagram showing a trailer aligned for coupling with a turntable of a vehicle;

FIG. 2 is an upper perspective view of a turntable of a vehicle;

FIG. 3 is an upper perspective view of part of a turntable of a vehicle fitted with a trailer safety system according to an embodiment of the present invention;

FIG. 10 is a side view of a vehicle coupled to a trailer including two trailer units (also known as a "B-double combination");

FIG. 11 is a side view of a vehicle coupled to two trailers (also known as a "road train"). The two trailers are coupled together with a dolly;

FIGS. 15A to 15C respectively show an upper perspective view and side view of a ringfeder bolt coupling fitted with a trailer safety system according to an embodiment of the present invention and a towing eye;

DETAILED DESCRIPTION

Figure 4:
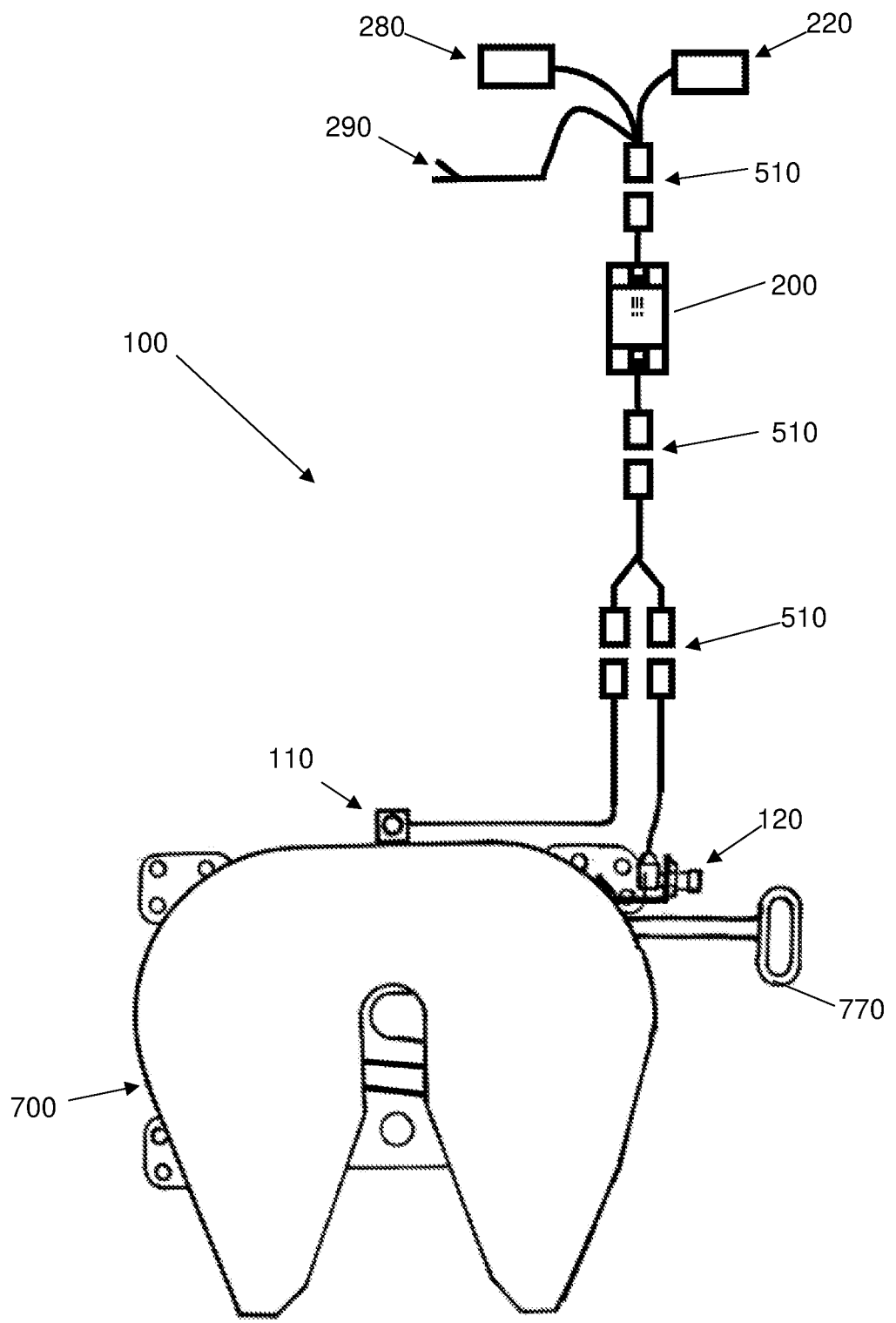
FIG. 4 is a top view of the turntable as shown in FIG. 3 with the trailer safety system fitted.

FIGS. 3 to 9B show a trailer safety system (100) or parts thereof according to an embodiment of the present invention for use with a turntable (700) of a prime mover (i.e., a vehicle).

Referring to FIG. 3, the system (100) includes two sensors associated with the turntable (700), namely a contact sensor (110) configured to detect when a skid plate of a trailer is in contact with the turntable (700) and a locking sensor (120) configured to detect when the locking mechanism of the turntable is in the locked configuration by a position of the locking handle (770) relative to the turntable (700).

Each of the sensors (110, 120) is a proximity sensor configured to detect the presence of a nearby object.

The contact sensor (110) is positioned on a front end edge (715) of the turntable (700) to detect the presence of a skid plate of a trailer and thus contact between the skid plate and the turntable (700). The contact sensor (110) is positioned to sense across the upper surface (712) of the top plate (710) of the turntable (700) to detect contact between the turntable (700) and a skid plate as the prime mover reverses towards a trailer to be towed.

Advantageously, by configuring the contact sensor (110) to detect contact, the contact sensor (110) ensures that a kingpin does not overshoot the turntable (700) but rather that the turntable (700) and the trailer are correctly positioned relative to each other for the kingpin to be correctly received in an entry channel for engagement in the kingpin locking aperture (740).

The contact sensor (110) has a nominal range (i.e., maximum distance that the sensor can detect) configured to detect contact between the turntable (700) and the skid plate of the trailer of between about 0 mm and 30 mm. The nominal range is adjustable to enable the sensor (110) to be precisely calibrated to detect as soon as the skid plate of the trailer is in contact with the turntable (700).

As shown, the contact sensor (110) is centrally positioned across the front-end edge (715).

The sensor (110) is mounted to the front-end edge (715) with bracket (112). The bracket (112) is fastened to the front-end edge (715) of the turntable (700) with a metal epoxy glue.

Figure 6A:
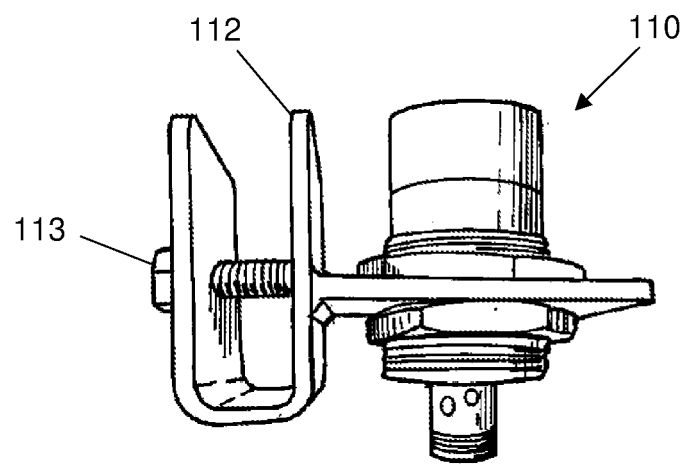
FIGS. 6A and 6B are respective views of a contact sensor and locking sensor of the system as shown in FIGS. 4 and 5 with associated brackets for fitting to a turntable of a vehicle.

Referring briefly to FIG. 6A, in another embodiment, the sensor (110) is mounted to the front-end edge (715; not shown) with bracket (112), which fits about a rim (714; not shown) of the turntable (700; not shown) and is secured in place with a threaded fastener (113).

Referring back to FIG. 3, the locking sensor (120) is configured to detect the presence of the locking handle (770) for thus detecting that the locking mechanism is in the locked configuration after engagement of the kingpin of the trailer with the jaws of the locking mechanism of the turntable (700).

The locking sensor (120) also has a nominal range configured to detect the proximity of the locking handle (770) to the locking sensor (120) when in the locked configuration and to differentiate when the locking handle (770) is in an unlocked configuration. In this regard, the locking sensor has a nominal range of between about 0 mm and about 15 mm. Again, the nominal range of the locking sensor (120) is adjustable to enable the sensor (120) to be precisely calibrated to detect as soon as the locking handle (770) of the locking mechanism is in a locking position indicative that the locking mechanism is in the locking configuration and thus that the kingpin is engaged by the turntable (700).

The locking sensor (120) is associated with a side of the turntable (700) adjacent the locking handle (770) at a junction between the front-end edge (715) and side edge (718).

The sensor (120) is mounted with bracket (122). The bracket (122) is fastened to the side edge (718) with a metal epoxy glue.

Figure 6B:
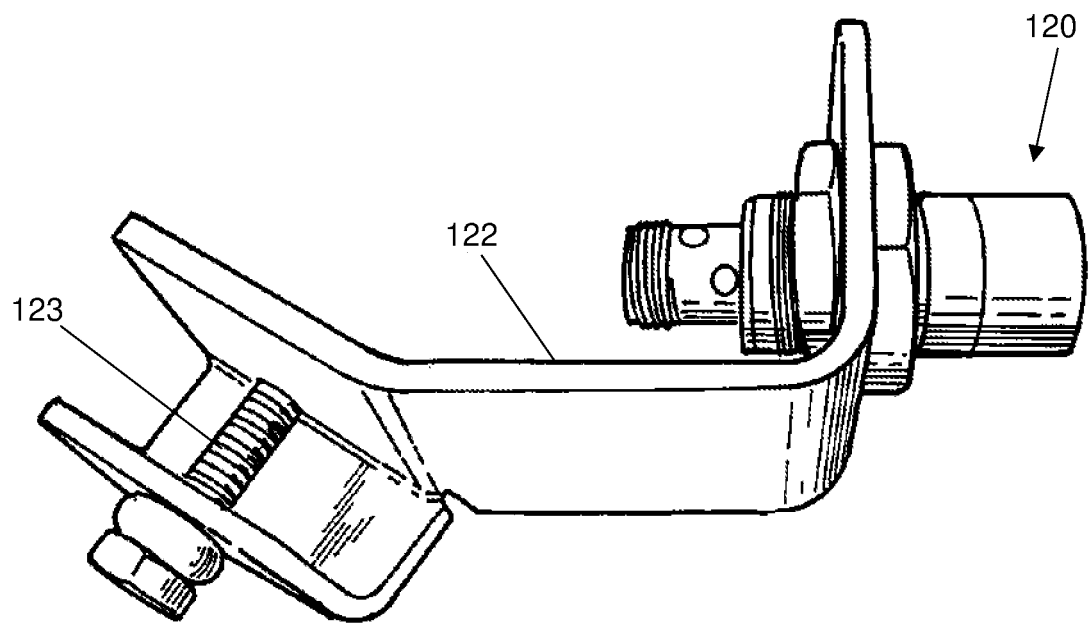

Referring briefly to FIG. 6B, in another embodiment, the sensor (120) is mounted to the junction between the front-end edge (715; not shown) and side edge (718; not shown) front-end edge (715; not shown) with bracket (122), which fits about the rim (714; not shown) of the turntable (700; not shown) and is secured in place with a threaded fastener (123).

Referring back to FIG. 3, the locking sensor (120) is positioned to sense outwards for detecting the presence of the locking handle (770) at is nears the sensor (120) indicative that the locking handle (770) has retracted into the turntable and thus that the locking mechanism is in the locked configuration.

Figure 5:
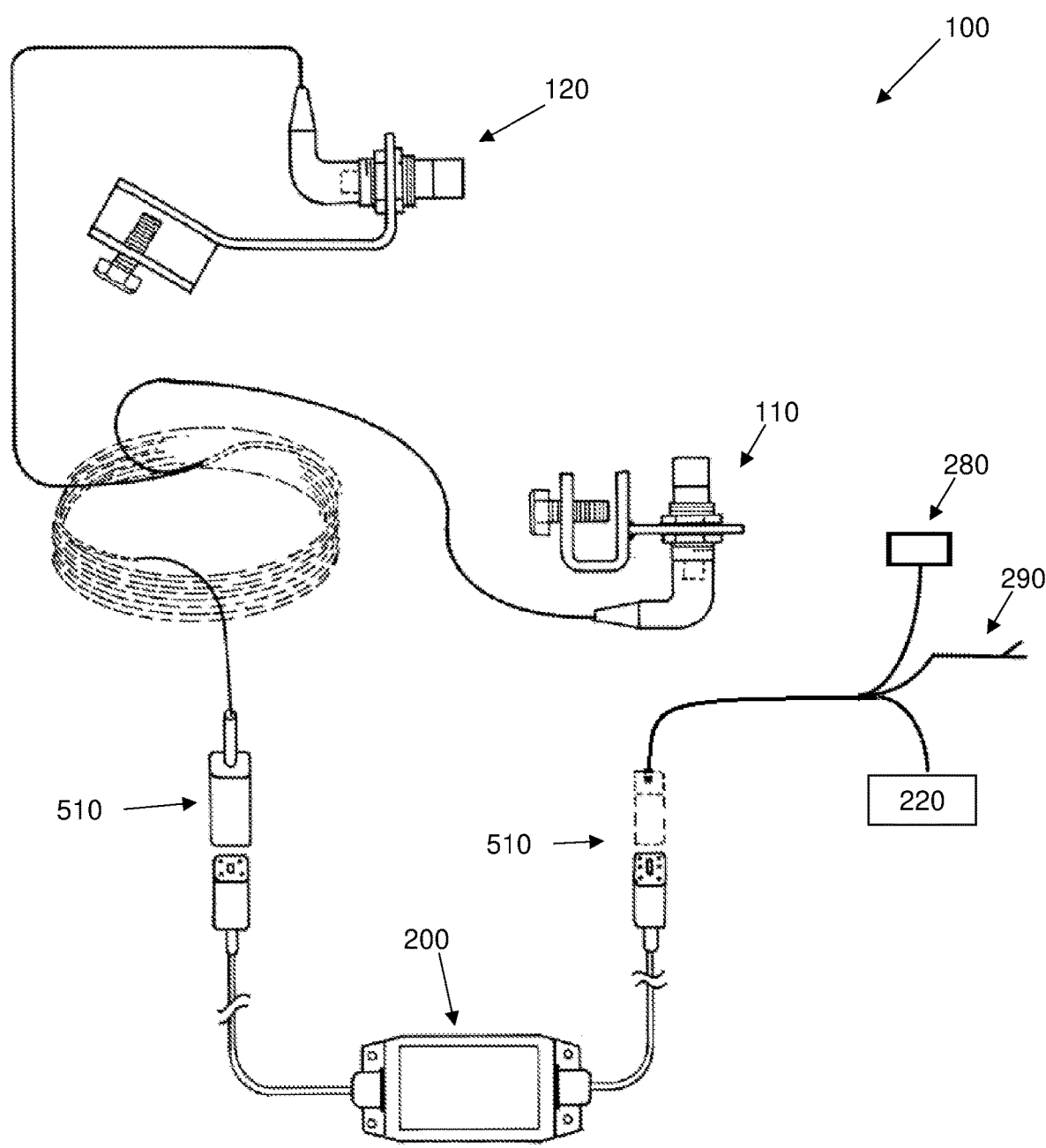
FIG. 5 is a perspective view showing an unfitted version of the trailer safety system as shown in FIG. 4.

Referring to FIGS. 4 and 5, each of the sensors (110, 120) responsive to detecting the skid plate or the locking handle (770) transmits an electrical output signal to a controller (200).

The controller (200) is operatively connected to the two sensors (110, 120) and configured to receive the electrical output signals and determine whether safe coupling has been achieved based on the output signals received. In turn, the controller (200) is operatively connected to a user interface (220) located in a cab of the prime mover.

The controller (200) is operatively connected to the sensors (110, 120) and the user interface (220) by electrical wiring. In some embodiments, the controller (200) is further connected to a GPS unit (280) and a power source (power from the vehicle; 290).

The wiring from each respective sensor (110, 120) and the wiring from the controller (200) are connectable by weatherproof plugs and sockets (510). Best shown in FIGS. 9A and 9B.

Figure 7A:
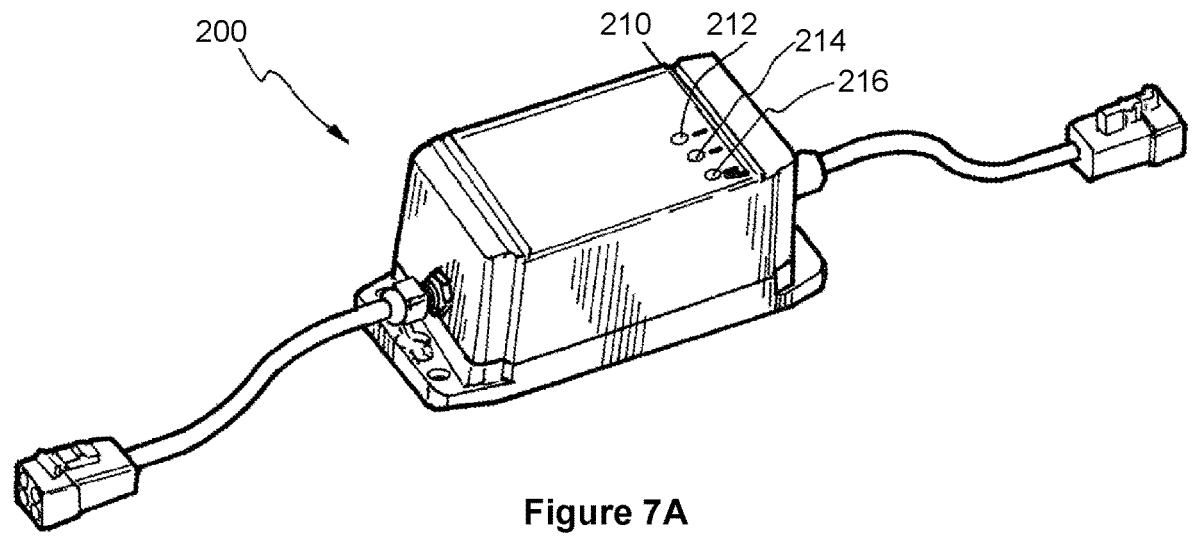
FIGS. 7A and 7B respective show an upper perspective view and internal view of a controller of the trailer system as shown in FIGS. 4 and 5.
Figure 7B:
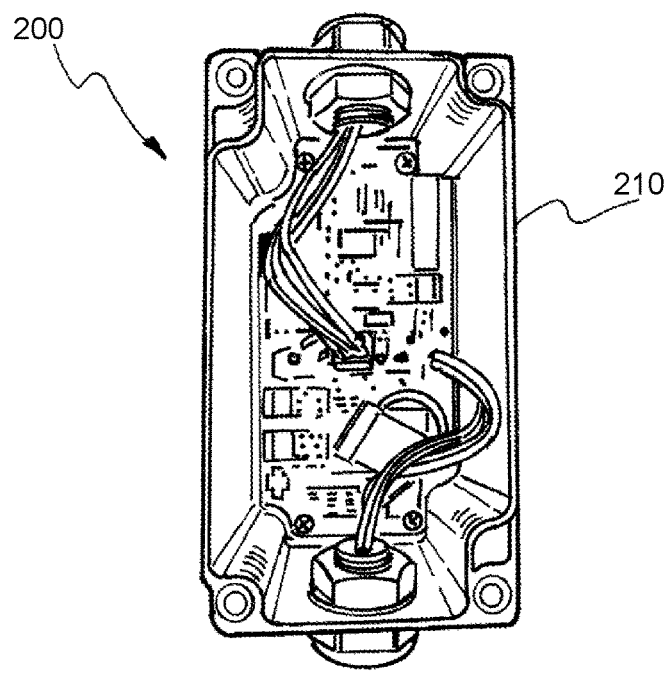

Referring to FIGS. 7A and 7B, the controller (200) is remotely located relative to the sensors, typically within the cab of the prime mover, although in some embodiments it may be located along the body of the trailer.

As shown, the controller (200) includes a housing (210). The housing (210) typically has the shape of a rectangular prism.

Referring to FIG. 7A, the controller (200) includes a signal generator for generating one or more alert signals. As shown, the signal generator of the controller (200) includes three visual signalling devices each in the form of a light-emitting diode ("LED"; 212, 214, 216) for respectively indicating when the controller (200) is powered, when an alarm is being generated and when there is a safe coupling.

Figure 8:
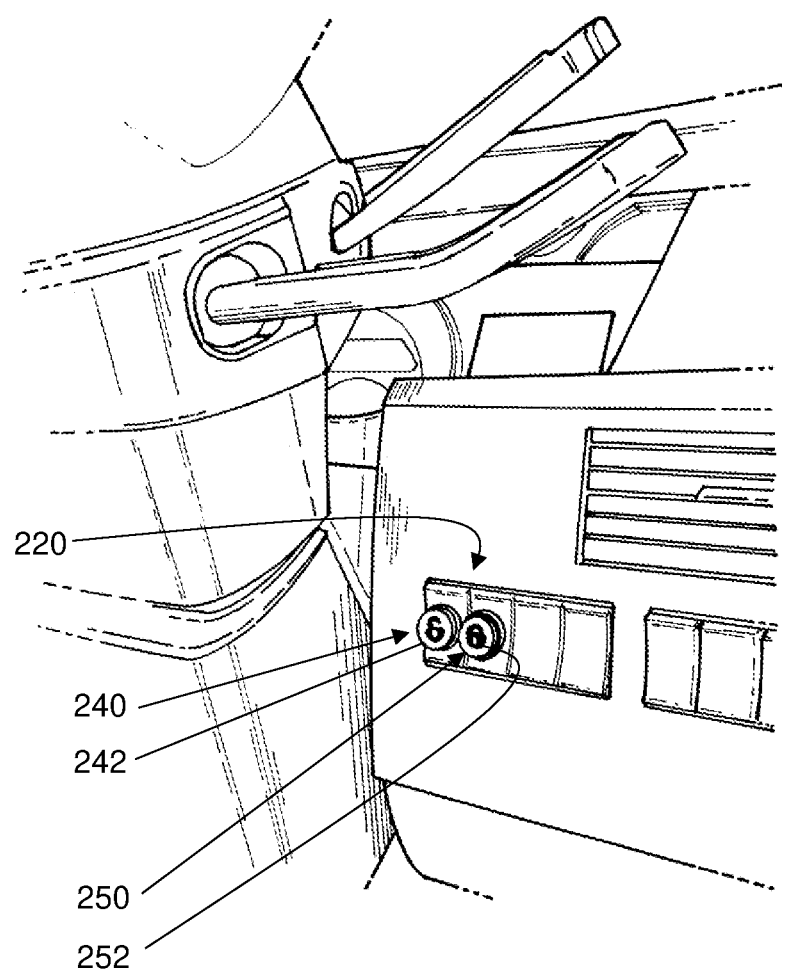
FIG. 8 is an upper perspective view of part of a dashboard of a prime mover showing an in-built user interface of the trailer system according to another embodiment of the present invention.
Figure 9A:
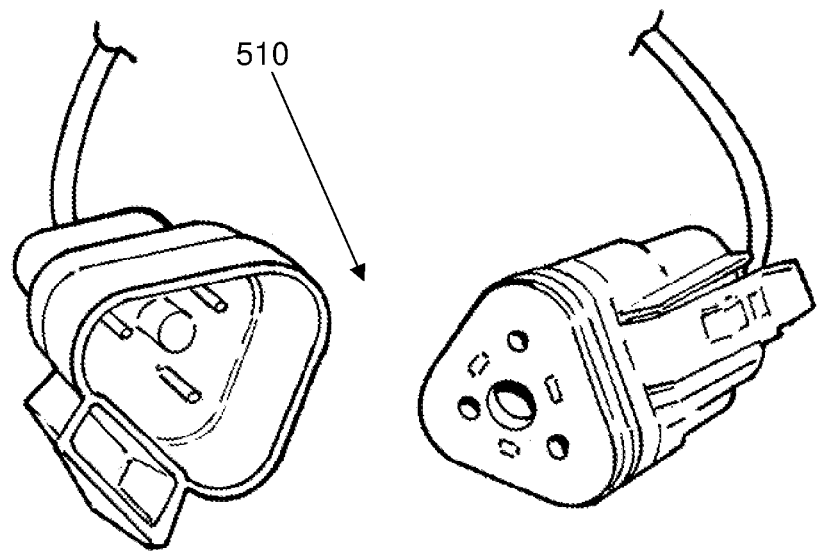
FIGS. 9A and 9B respectively show perspective views of different plug-types for connecting components of the trailer safety system together.
Figure 9B:
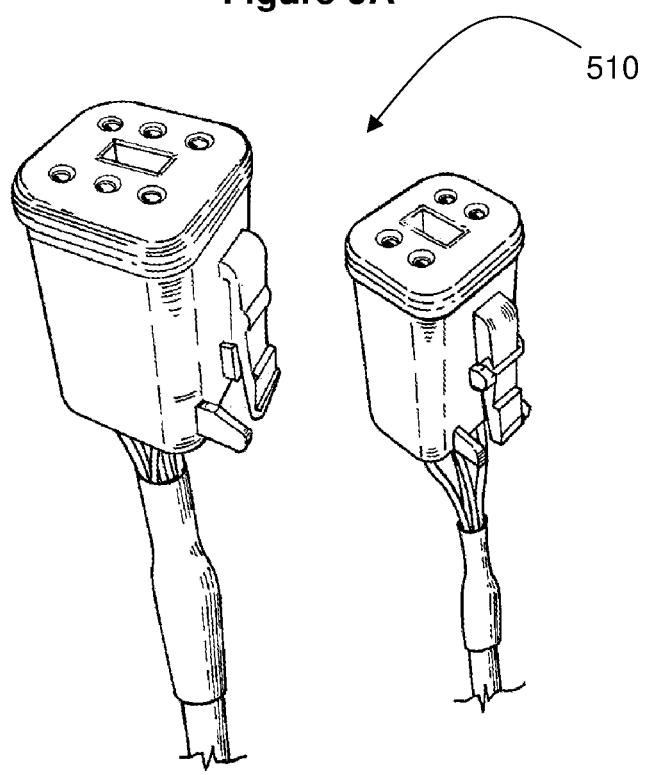

Referring to FIG. 8 and as previously indicated, the controller (200; not shown) is in turn operatively connected to a user interface (220) installed behind the dashboard in the cab of the prime mover. The controller (200; not shown) is operatively connected by electrical wiring.

The user interface (220) also includes a signal generator for generating one or more alert signals for alerting a driver.

For example, the signal generator generates at least one first alert signal when an output signal is received from the contact sensor indicative that the skid plate is in contact with the turntable, and the at least one first alert signal is maintained until an output signal is received from the locking sensor indicative that the locking mechanism is in the locked configuration, thus confirming that the trailer has been safely coupled. At this stage, the signal generator generates at least one second alert signal.

The signal generator includes at least one audio signalling device in the form of a pulsating beeper. The beeper is integrated in the dashboard of the prime mover.

The signal generator also includes two visual signalling devices in the form of two light-emitting diodes ("LEDs"; 240, 250) forming part of the user interface (220).

A first LED (240) emits a red light when the contact sensor detects contact between the turntable and a skid plate of a trailer. As shown, an outer cover (242) of the first LED (240) includes an unlock padlock symbol to indicate that the trailer is not yet safely coupled to the prime mover.

A second LED (250) emits a green light when the locking sensor detects the presence of the locking handle in a retracted state indicative that the locking mechanism of the turntable is in the locked configuration. As also shown, an outer cover (252) of the second LED (250) includes a locked padlock symbol to indicate that the trailer is now safely coupled to the prime mover.

Referring again to FIGS. 7A and 7B, the controller (200) further include a communications module for connecting the controller (200) and the system (200) to an external device, such as, e.g., a remotely accessible server, an external processing device (e.g., computer, tablet, smart phone, smart watch or PDA), an external display, an external printer or a storage device (e.g., a hard drive).

The communication module is in the form of a wireless communication module, such as, e.g., a wireless network interface controller, such that the controller may wirelessly connect to an external device through a wireless network (e.g., Wi-Fi (WLAN) communication, Satellite communication, RF communication, infrared communication, or Bluetooth™).

The controller (200) also includes a microcomputer, including one or more processors and a memory. The one or more processors are low power processors. The processors include multiple inputs and outputs coupled to other electronic components of the controller (200).

Lastly, the controller (200) draws power from the vehicle for powering the electrical components of the system (100).

FIGS. 10 to 14, 16 and 17 show a trailer safety system (100) or parts thereof according to another embodiment of the present invention for use with a turntable (700) of a trailer (800).

Referring to FIG. 10, the system (100) can be used to monitor safe coupling between a first trailer (800A) having a rear turntable (700) and a second trailer (800B).

Alternatively and referring to FIG. 11, the system (100) can be used to monitor safe coupling between dolly (600) having a turntable (700) and a second trailer (800).

Figure 12:
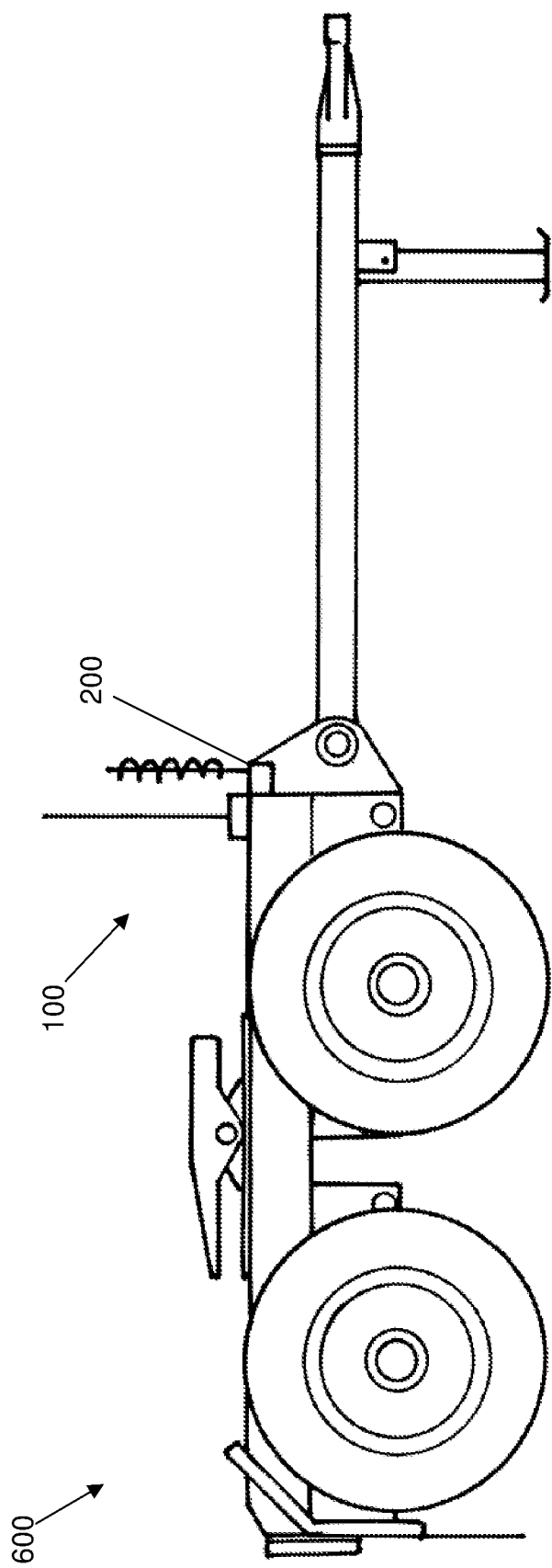
FIG. 12 is a side view of the dolly as shown in FIG. 12.

FIG. 12 shows a side view of the dolly (600) shown in the FIG. 11. As shown, the controller (200) of the system (100) in such embodiments is mounted to a front portion of the dolly (600).

Figure 13:
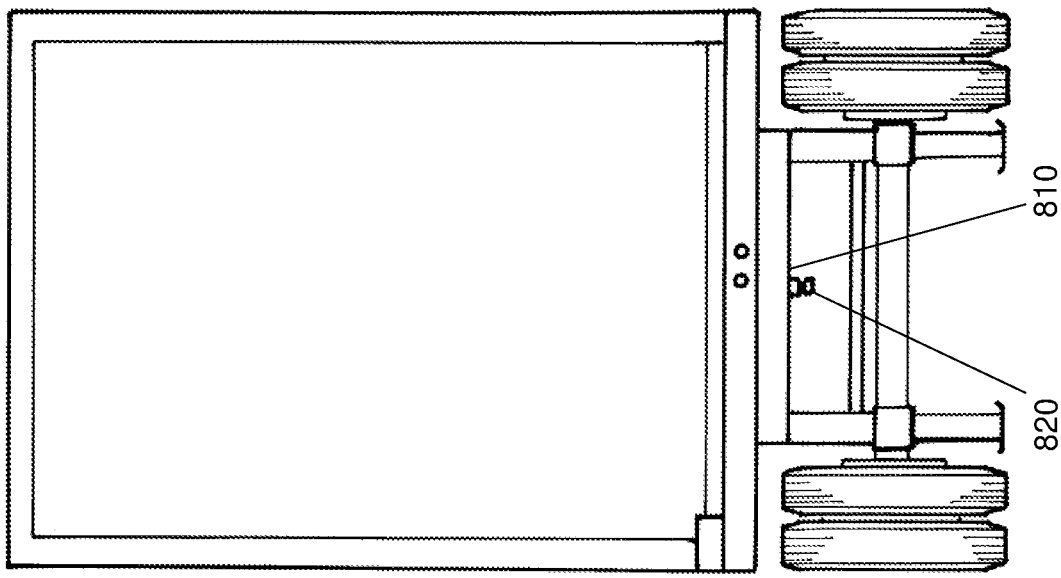
FIG. 13 is a front view of a trailer as shown in FIG. 10 or 11.

FIG. 13 shows a front view of the second trailer (800) as shown in FIGS. 10 and 11. The kingpin (820) and skid plate (810) are plainly visible extending downward from a front portion of the trailer (800) for engagement with a turntable of a first trailer or a dolly.

Figure 14:
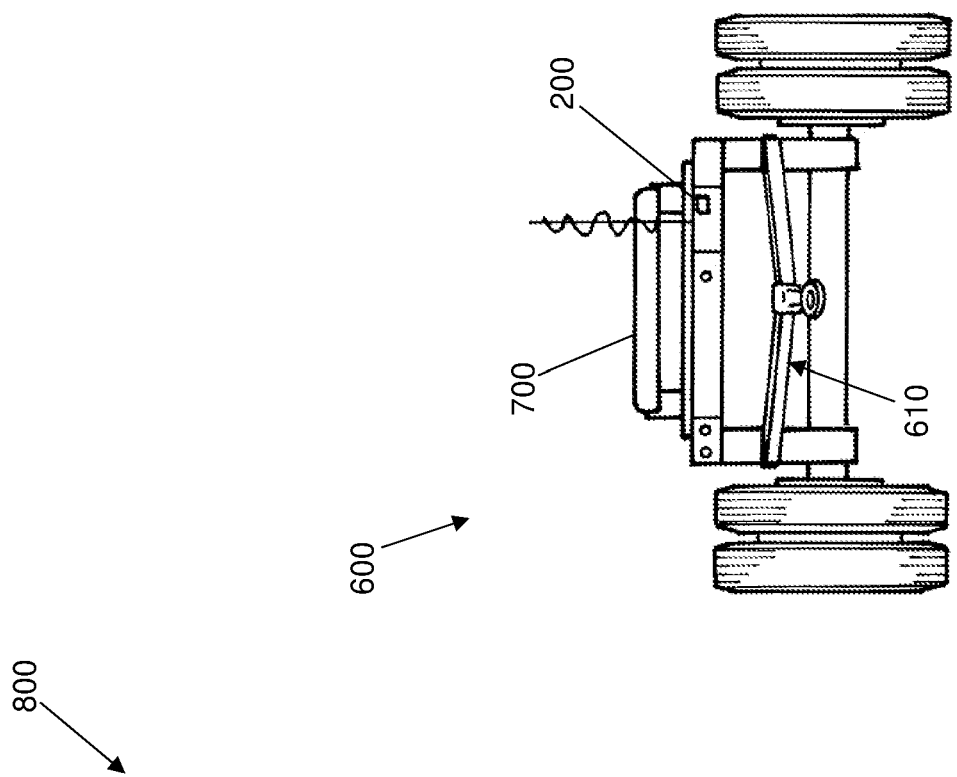
FIG. 14 is a front view of the dolly as shown in FIG. 11 or 12.

FIG. 14 shows a front view of the dolly (600) as shown in FIGS. 11 and 12. The dolly (600) includes a draw bar (610) for coupling to a hitch of a first trailer and a turntable (700) for coupling to a second trailer.

Figure 16:
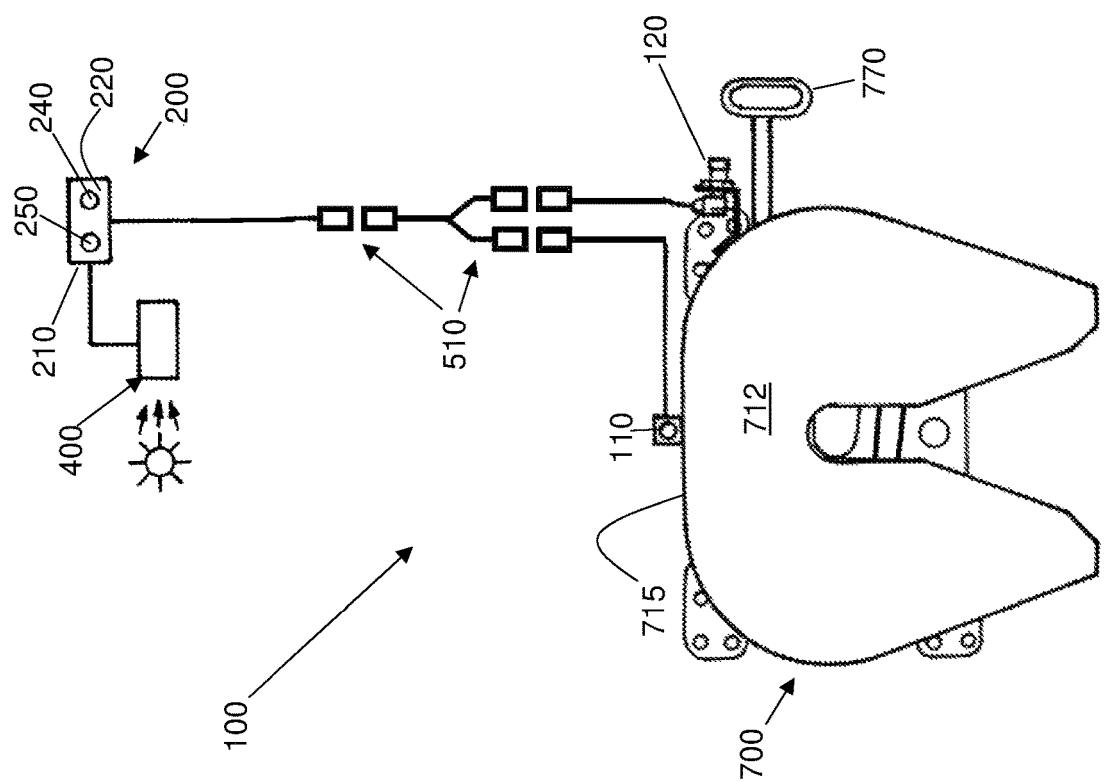
FIG. 16 is a top view of a turntable from a trailer or dolly fitted with a trailer safety system according to another embodiment of the present invention.

Referring to FIG. 16, the system (100) includes two sensors associated with the turntable (700), namely a contact sensor (110) configured to detect when a skid plate of a trailer is in contact with the turntable (700) and a locking sensor (120) configured to detect when the locking mechanism of the turntable is in the locked configuration by a position of the locking handle (770) relative to the turntable (700).

The contact sensor (110) is positioned on a front end edge (715) of the turntable (700) to detect the presence of a skid plate of a trailer and thus contact between the skid plate and the turntable (700). The contact sensor (110) is positioned to sense across the upper surface (712) of the top plate (710) of the turntable (700) to detect contact between the turntable (700) and a skid plate as the prime mover reverses towards a trailer to be towed.

The locking sensor (120) is configured to detect the presence of the locking handle (770) for thus detecting that the locking mechanism is in the locked configuration after engagement of the kingpin of the trailer with the jaws of the locking mechanism of the turntable (700).

Each of the sensors (110, 120) responsive to detecting the skid plate or the locking handle (770) transmits an electrical output signal to the controller (200).

As shown, the controller (200) is operatively connected to the two sensors (110, 120) and configured to receive the electrical output signals and determine whether safe coupling has been achieved based on the output signals received.

The controller (200) is operatively connected to the sensors (110, 120) by electrical wiring. In particular, electrical wiring extends from the controller (200), which is mounted on a front end of the trailer, to the turntable (700).

Again, the wiring from each respective sensor (110, 120) and the wiring from the controller (200) are connectable by a pair of weatherproof plug and sockets (510).

The controller (200) includes a housing (210). The housing (210) typically has the shape of a rectangular prism.

The controller (200) includes a user interface (220). As previously mentioned, the housing (210) is configured to be mounted to a front portion of each trailer having a turntable (700; shown only in FIG. 16) such that a driver coupling a multiple trailer combination can confirm safe coupling has been achieved between adjacent trailers with a quick visual inspection of the controller (200) when connecting airlines and electrical cables between the trailers.

As before, the controller (200) includes a signal generator for generating one or more alert signals for alerting a driver.

For example, the signal generator generates at least one first alert signal when an output signal is received from the contact sensor indicative that the skid plate is in contact with the turntable, and the at least one first alert signal is maintained until an output signal is received from the locking sensor indicative that the locking mechanism is in the locked configuration, thus confirming that the trailer has been safely coupled. At this stage, the signal generator generates at least one second alert signal.

The signal generator includes two visual signalling devices in the form of two light-emitting diodes ("LEDs"; 240, 250) forming part of the user interface (220).

A first LED (240) emits a red light when the contact sensor (110; shown only in FIG. 16) detects contact between the turntable (700; shown only in FIG. 16) and a skid plate to indicate that the first trailer is not yet safely coupled to the second trailer.

A second LED (250) emits a green light when the locking sensor (120; shown only in FIG. 16) detects the presence of the locking handle (770; shown only in FIG. 16) in a retracted state indicative that the locking mechanism of the turntable (700; shown only in FIG. 16) is in the locked configuration to indicate that the first trailer is now safely coupled to the second trailer.

As previously described, the controller (200) a communications module; and a microcomputer, including one or more processors and a memory.

Figure 17:
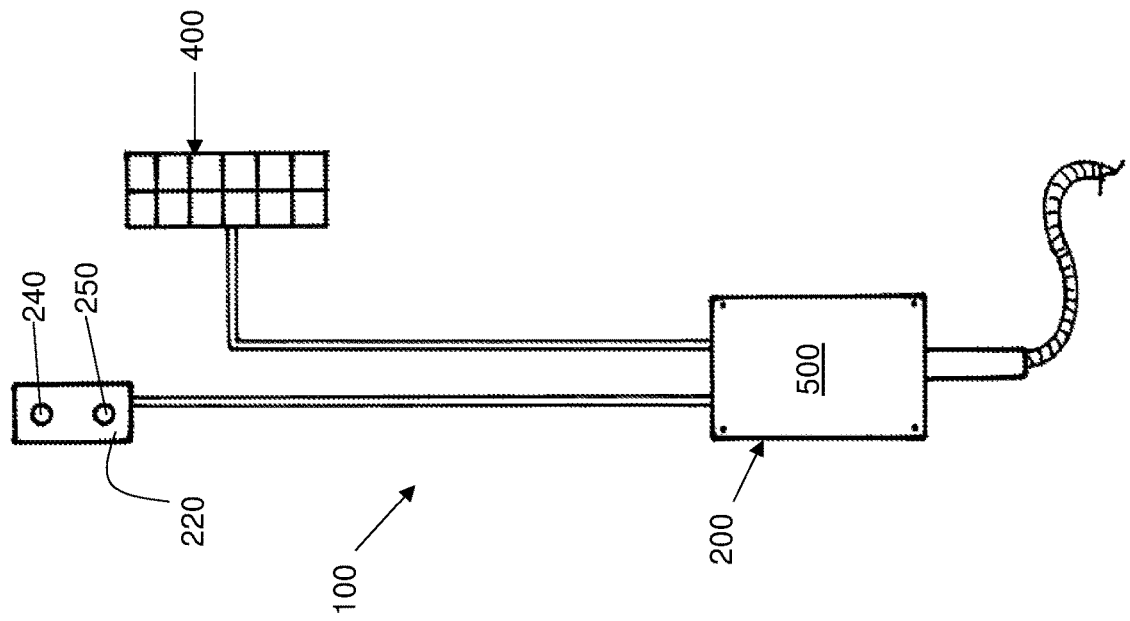
FIG. 17 is a schematic showing parts of a trailer safety system according to another embodiment of the present invention.

Referring to FIG. 17, in this variation of the embodiment shown in FIG. 16, the weatherproof plug and sockets are contained in a junction box (500) mounted to a portion of the trailer together with the controller (200), and the user interface (220) is operatively connected to the controller (200) by electrical wiring. The user interface (220) includes a signal generator including two visual signalling devices in the form of two light-emitting diodes ("LEDs"; 240, 250) as described above. The user interface (220) is again configured to be mounted to a front portion of each trailer having a turntable (700; shown only in FIG. 16) such that a driver coupling a multiple trailer combination can confirm safe coupling has been achieved between adjacent trailers with a quick visual inspection of the user interface (220) when connecting airlines and electrical cables between the trailers.

As shown in both FIGS. 16 and 17, the system (100) includes a photovoltaic solar panel (400), an inverter and one or more batteries for storing generated electricity and from which the controller (200) and system (100) components can draw power.

The solar panel (400) can be mounted to a sun-exposed portion of a trailer.

In the embodiment shown in FIG. 16, the solar panel (400) is operatively connected to the controller (200), which also houses the inverter and the one or more batteries.

In the embodiment shown in FIG. 17, the solar panel (400) is instead operatively connected to the junction box (500), which in this embodiment houses the inverter and the one or more batteries.

FIGS. 15A to 15C show a trailer safety system (1100) or parts thereof according to another embodiment of the present invention for use monitoring a ringfeder bolt coupling (1500) between a leading vehicle or trailer and a trailing trailer.

The ringfeder bolt coupling (1500) enables the trailing trailer to be coupled to a leading vehicle by a draw bar connection. The draw bar having a towing eye (1510) as shown in FIG. 15C at a front or forward end of the draw bar. The towing eye (1510) is configured to be received within and coupled to coupling body (1520), shown in FIGS. 15A and 15B, mounted to a rear end of the leading vehicle or trailer.

The coupling body (1520) includes a rear-faced opening (1522) for at least partially receiving the towing eye (1510; shown in FIG. 15C) and a sliding coupling pin (1524; shown only in FIG. 15A) configured to be received through a central opening (1512) or "eye" of the towing eye (1510; shown in FIG. 15C) to couple the trailing trailer to the leading vehicle or trailer.

The coupling further includes an internal locking mechanism for automatically sliding the coupling pin (1524; shown only in FIG. 15A) to a downwardly extending locked configuration in which the pin (1524; shown only in FIG. 15A) may extend through the central opening (1512) or "eye" of the towing eye (1510; shown in FIG. 15C) when present, and an unlocked configuration in which the pin (1524; shown only in FIG. 15A) is held clear of the central opening (1512) or "eye". Sliding of the pin (1524; shown only in FIG. 15A) to the unlocked configuration is manually actuated by locking handle (1526) extending from the coupling body (1520).

Referring to FIG. 15B, the coupling body (1520) further includes indicator pin (1528) configured to provide an external indicator when the locking mechanism is in the locked configuration. The indicator pin (1528) protrudes proudly from the surface of the coupling body (1520) when the locking mechanism is in the locked configuration.

Referring to FIG. 15B, the system (1100) includes two sensors associated with the coupling body (1520), namely a proximity sensor (1110) configured to detect when the presence of the towing eye (1510; shown in FIG. 15C) of the trailing trailer as it enters the rear-facing opening (1522) of the coupling body (1520) and a locking sensor (1120) configured to detect the protruding indicator pin (1528) indicative that the locking mechanism is in the locked configuration.

Each of the sensors (1110, 1120) is a proximity sensor configured to detect the presence of a nearby object.

The sensors (1110, 1120) are mounted with brackets (1112, 1122) to an external surface of the coupling body (1520). The brackets (1112, 1122) are fastened to the coupling body (1520) with a metal epoxy glue.

Both sensors (1110, 1120) are operatively connected to the controller (200; not shown) as previously described by electrical wiring.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A trailer safety system for monitoring a vehicle and trailer coupling or a first trailer and second trailer coupling, said system including:
    two sensors associated with a turntable of the vehicle or the first trailer, said sensors consisting of:
        a contact sensor positioned on a front-end edge of the turntable and configured to detect when a skid plate of the trailer or the second trailer is in contact with the turntable for engagement of a kingpin of the trailer or the second trailer with a pair of jaws of the turntable; and
        a locking sensor configured to detect when a locking mechanism is in a locked configuration; and
    a controller operatively connected to the two sensors and configured to receive output signals from the contact sensor and the locking sensor and to determine whether safe coupling has been achieved based on the output signals,
    wherein said safe coupling is determined to have been achieved when the contact sensor detects contact between the skid plate and the turntable and the locking sensor detects that the locking mechanism is in the locked configuration after the engagement of the kingpin of the trailer or the second trailer with the pair of jaws of the turntable.

2. The system of claim 1, wherein the contact sensor is positioned to sense across an upper surface of a top plate of the turntable to detect contact between the turntable and the skid plate as the vehicle reverses towards the trailer to be towed.

3. The system of claim 1, wherein the contact sensor is centrally mounted across a front-end edge of the turntable.

4. The system of claim 1, wherein the locking sensor is positioned to detect when a locking handle associated with a locking mechanism of the turntable is at least partially retracted into the turntable and thus that the locking mechanism is in the locked configuration.

5. The system of claim 1, wherein the locking sensor is mounted at a junction between a side edge and a front-end edge of the turntable.

6. The system of claim 1, wherein the sensors are indirectly mounted to the turntable via brackets.

7. The system of claim 6, wherein the brackets are adhesively bonded to the turntable with a metal epoxy glue.

8. The system of claim 6, wherein the brackets are fitted around a rim of a top plate of the turntable and fastened in place with a threaded fastener.

9. The system of claim 1, wherein the controller includes a signal generator for generating one or more alert signals for alerting a driver.

10. The system of claim 1, wherein the controller is operatively connected to a user interface installed in or mounted to a dashboard of the vehicle, the user interface including a signal generator for generating one or more alert signals for alerting a driver.

11. The system of claim 1, further including a remotely accessible server operatively connected to the controller for receiving and remotely monitoring data corresponding to the output signals from the sensors, said server configured to generate an alert when said data received from any one of the sensors or the controller is indicative that the trailer is improperly coupled or not connected.

12. The system of claim 11, wherein the controller further includes a radio or cellular modem for wireless communication with the remotely accessible server.

13. The system of claim 11, wherein the server is in communication with a fleet database containing a plurality of coupling records for each truck/trailer coupling and/or trailer/trailer coupling.

14. The system of claim 11, wherein responsive to the remotely accessible server identifying data indicative of a trailer being improperly coupled or not coupled, the server generates and transmits an alert to a computing device of a fleet controller.

15. The system of claim 14, wherein upon identifying said data, generation and transmission of the alert is delayed to enable a driver to correct the coupling.

16. A method of assisting in safe coupling of a trailer to a vehicle, said method including:
    determining when a skid plate of the trailer is aligned and resting on top of a turntable of the vehicle based on an output signal of a contact sensor positioned on a front-end edge of the turntable and configured to detect when the skid plate is in contact with the turntable;

determining when a kingpin of the trailer engages with a pair of jaws of the turntable based on an output signal of a locking sensor configured to detect when a locking mechanism is in a locked configuration, wherein said locking mechanism transitions to the locked configuration upon engagement of the kingpin and the pair of jaws; and alerting a driver in a cab of the vehicle when safe coupling has been achieved, said alerting including an alert signal generated by a controller operatively connected to the contact sensor and the locking sensor and configured to receive output signals from the contact sensor and the locking sensor, wherein said safe coupling is determined to have been achieved when the contact sensor detects contact between the skid plate and the turntable and the locking sensor detects that the locking mechanism is in the locked configuration.

17. The method of claim 16, wherein when the vehicle is correctly positioned for engagement between the turntable and the skid plate of the trailer, the drive reverses the vehicle until contact is determined by the contact sensor.

18. The method of claim 16, wherein upon detecting contact, the contact sensor transmits an output signal to the controller and the controller generates a continuous first alert signal alerting the driver of contact.

19. The method of claim 18, wherein upon generation of the first alert signal, the driver continues to reverse the vehicle towards the trailer until the kingpin of the trailer engages with the pair of jaws of the turntable causing the locking mechanism of the turntable to transition to the locked configuration and a locking handle to at least partially retract into the turntable.

20. The method of claim 19, wherein upon detecting the locking handle in an at least partially retracted state, the locking sensor transmits an output signal to the controller indicating that the locking mechanism is in the locked configuration and the controller kills the continuous first alert signal.

21. The method of claim 20, wherein the controller generates a second alert signal alerting the driver that safe coupling has been achieved.

* * * * *